(12) United States Patent
Ichikawa et al.

(10) Patent No.: US 10,014,720 B2
(45) Date of Patent: Jul. 3, 2018

(54) POWER TRANSMISSION SYSTEM

(71) Applicant: Murata Manufacturing Co., Ltd., Nagaokakyo-shi, Kyoto-fu (JP)

(72) Inventors: Keiichi Ichikawa, Nagaokakyo (JP); Shinji Goma, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 388 days.

(21) Appl. No.: 14/802,342

(22) Filed: Jul. 17, 2015

(65) Prior Publication Data

US 2015/0326033 A1 Nov. 12, 2015

Related U.S. Application Data

(63) Continuation of application No. PCT/JP2014/051084, filed on Jan. 21, 2014.

(30) Foreign Application Priority Data

Jan. 21, 2013 (JP) ................................. 2013-008458

(51) Int. Cl.
*H02M 3/06* (2006.01)
*H02J 50/05* (2016.01)
(Continued)

(52) U.S. Cl.
CPC ............. *H02J 50/05* (2016.02); *H02J 5/005* (2013.01); *H02J 7/025* (2013.01); *H02J 50/12* (2016.02)

(58) Field of Classification Search
USPC ............................................. 307/109, 104
See application file for complete search history.

(56) References Cited

U.S. PATENT DOCUMENTS

2009/0302690 A1 12/2009 Kubono et al.
2012/0262005 A1 10/2012 Camurati et al.
(Continued)

FOREIGN PATENT DOCUMENTS

JP 2009-89520 A 4/2009
JP 2009-531009 A1 8/2009
(Continued)

OTHER PUBLICATIONS

International Search Report issued for PCT/JP2014/051084, dated Apr. 22, 2014.
(Continued)

*Primary Examiner* — Rexford Barnie
*Assistant Examiner* — Dru Parries
(74) *Attorney, Agent, or Firm* — Arent Fox LLP

(57) ABSTRACT

A power transmission system includes a charging station and a power receiving device. The charging station has a pair of first electrodes, and a signal source that emits an alternating current signal; and a step-up transformer that applies a stepped-up voltage to the pair of first electrodes. The power receiving device has a pair of second electrodes opposite to and that capacitively couple with the first electrodes; a step-down transformer; a rectifying and smoothing circuit that rectifies and smoothes the stepped-down AC voltage; and a load circuit, The charging station further has a potential stabilizing electrode that capacitively couples with the electrode connected to a reference potential of the power receiving device and the potential stabilizing electrode is connected to a reference potential of the charging station via a charge controller.

20 Claims, 22 Drawing Sheets

(51) Int. Cl.
*H02J 5/00* (2016.01)
*H02J 7/02* (2016.01)
*H02J 50/12* (2016.01)

(56) References Cited

U.S. PATENT DOCUMENTS

2013/0270922 A1   10/2013  Kato et al.
2014/0152122 A1    6/2014  Ichikawa

FOREIGN PATENT DOCUMENTS

| JP | 2009-296657 A | 12/2009 |
| WO | WO 2012/086411 A1 | 6/2012 |
| WO | WO 2012/157011 A1 | 11/2012 |
| WO | WO 2012/172930 A1 | 12/2012 |

OTHER PUBLICATIONS

Written Opinion of the International Searching Authority issued for PCT/JP2014/051084, dated Apr. 22, 2014.

POWER TRANSMISSION SYSTEM

CROSS REFERENCE TO RELATED APPLICATIONS

The present application is a continuation of PCT/JP2014/051084 filed Jan. 21, 2014, which claims priority to Japanese Patent Application No. 2013-008458, filed Jan. 21, 2013, the entire contents of each of which are incorporated herein by reference.

FIELD OF THE INVENTION

The present invention relates to power transmission systems that transmit power from a power transmitting apparatus to a power receiving apparatus through electric field coupling.

BACKGROUND OF THE INVENTION

Patent Document 1 discloses an electric field coupling-type (non-contact) power transmission system (power supply system) that includes a power transmitting apparatus (a fixed unit) and a power receiving apparatus (a mobile unit).

Patent Document 1: Japanese Unexamined Patent Application Publication No. 2009-89520

The power receiving apparatus may not operate correctly if a touch panel provided in the power receiving apparatus is operated while the power receiving apparatus is placed on the power transmitting apparatus and power is being transmitted through electric field coupling.

SUMMARY OF THE INVENTION

It is an object of the present invention to provide a power transmission system in which a power receiving apparatus can be operated correctly even in the case where an electrostatic capacitive type input device (a touch panel, for example) provided in the power receiving apparatus is operated while the power receiving apparatus is placed on an electric field coupling-type power transmitting apparatus and power is being transmitted.

A power transmission system according to the present invention includes a power transmitting apparatus and a power receiving apparatus. The power transmitting apparatus has at least one pair of first electrodes, and a signal source that emits an alternating current signal; and a step-up transformer that steps up a voltage of the alternating current signal emitted from the signal source and applies the voltage of the stepped-up alternating current signal to the at least pair of first electrodes. The power receiving apparatus has at least a pair of second electrodes disposed opposite to and that capacitively couple with the respective first electrodes; a step-down transformer that steps down an AC voltage produced between the at least pair of second electrodes; a rectifying and smoothing circuit that rectifies and smoothes the AC voltage stepped down by the step-down transformer; and a load circuit that is connected to the rectifying and smoothing circuit and to which power received from the power transmitting apparatus is supplied. Here, one apparatus of the power transmitting apparatus and the power receiving apparatus further includes a potential stabilizing electrode that capacitively couples with an electrode connected to a reference potential of the other apparatus; at least one of the step-up transformer and the step-down transformer is an isolation transformer; and the potential stabilizing electrode is connected to a reference potential of the one apparatus via a charge controller.

According to the present invention, it is possible to provide a power transmission system in which a power receiving apparatus can be operated correctly even in the case where an electrostatic capacitive is input device (a touch panel, for example) provided in the power receiving apparatus is operated while the power receiving apparatus is placed on an electric field coupling-type power transmitting apparatus and power is being transmitted.

DETAILED DESCRIPTION OF THE EXEMPLARY EMBODIMENTS

Embodiments of the present invention will be described hereinafter.

1. Circumstances of the Disclosed System

In general, a power receiving apparatus may not operate correctly if a touch panel provided in the power receiving apparatus is operated while the power receiving apparatus is placed on an electric field coupling-type power transmitting apparatus and power is being transmitted. After various considerations, the inventors of the present application found that this problem occurs particularly in electrostatic capacitive detection-type touch panels. The reason for this is that a reference potential (a ground potential of circuits) of the power receiving apparatus varies relative to an earth potential, and thus in the case where a user whose is near the earth potential touches the power receiving apparatus (touch panel), a potential difference arises between the user's finger and the power receiving apparatus ground; this results in an electric field being applied to the touch panel relatively, and the power receiving apparatus (touch panel) may therefore operate erroneously.

In response to this, the present invention provides a reference potential stabilizing circuit for stabilizing the reference potential of the power receiving apparatus, This will be described in detail hereinafter.

First Embodiment

1. Configuration

Hereinafter, a power transmission system according to the first embodiment of the present invention will be described in detail with reference to the drawings.

1-1. Basic Configuration

Figure 1:
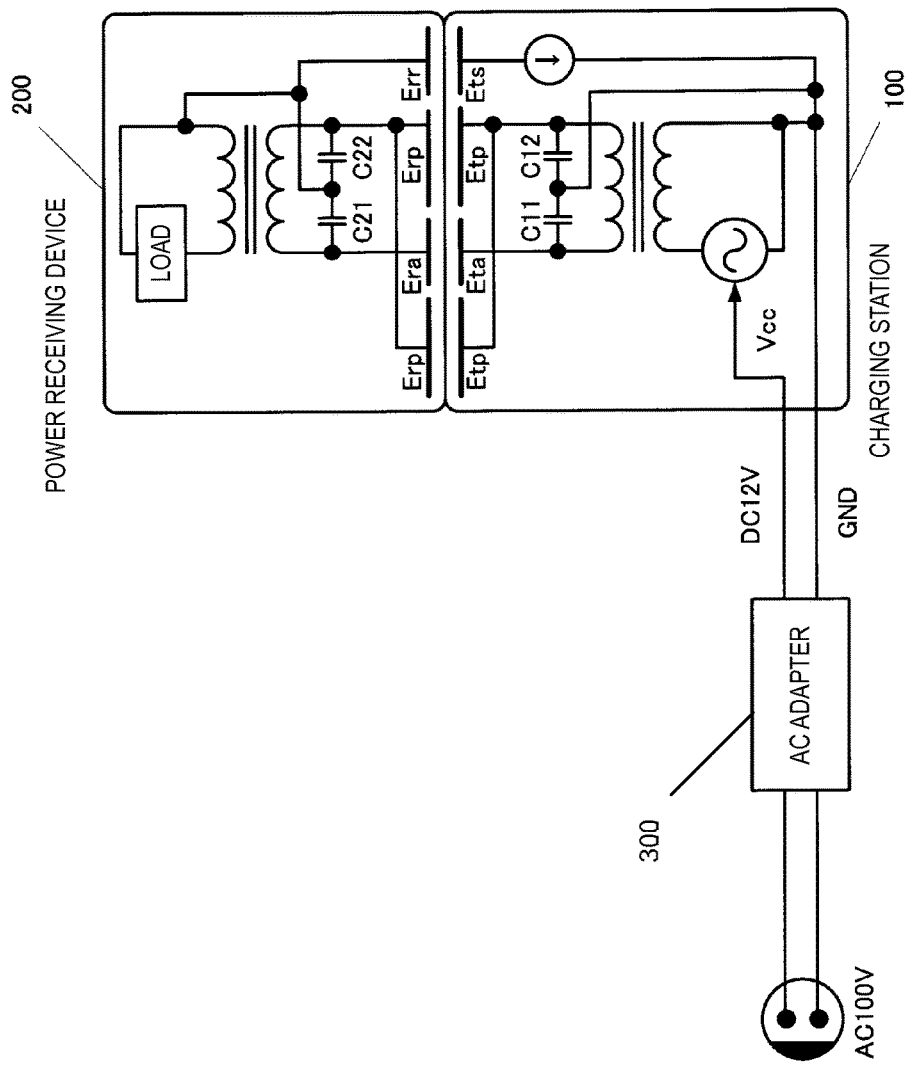
FIG. 1 is a diagram illustrating the configuration of a power transmission system according to a first embodiment of the present invention.

FIG. 1 is a diagram illustrating the circuit configuration of the power transmission system according to the first embodiment. The power transmission system according to this embodiment is an electric field coupling type power transmission system.

The power transmission system includes a charging station 100, a power receiving device 200, and an AC adapter 300.

The AC adapter 300 converts an AC voltage into a DC voltage and supplies the DC voltage to the charging station 100. The AC adapter 300 converts an AC 100V AC voltage into a DC 12V DC voltage, for example.

The charging station 100 corresponds to a power transmitting apparatus. The power receiving device 200 corresponds to a power receiving apparatus. The power receiving device 200 includes an electrostatic capacitive detection-type touch panel, and executes a predetermined function based on an input made by a user to the touch panel. Specific configurations of the charging station 100 and the power receiving device 200 will be described hereinafter with reference to FIG. 2.

Figure 2:
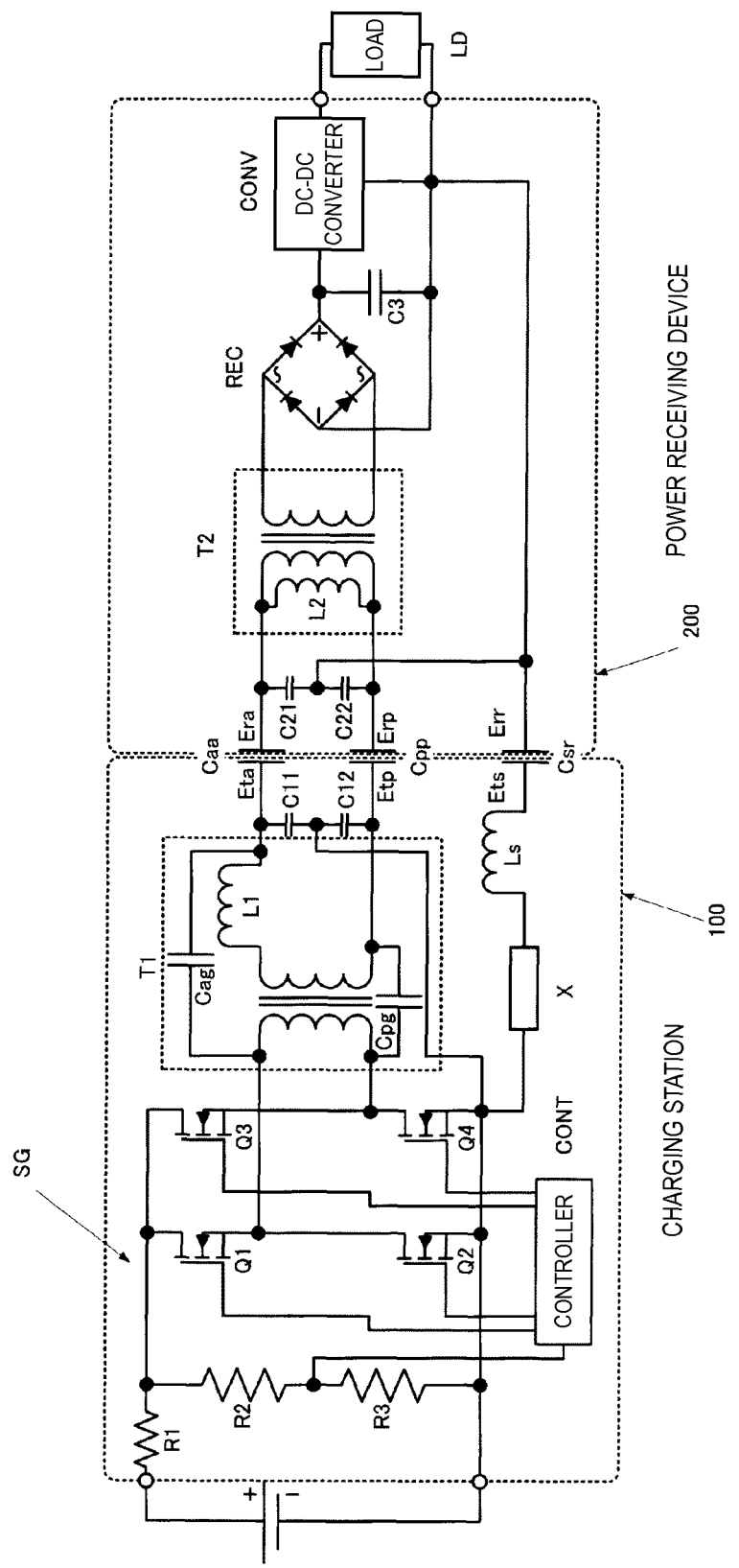
FIG. 2 is a diagram illustrating a specific circuit configuration of a power transmission system according to the first embodiment of the present invention.

FIG. 2 is a diagram illustrating circuit configurations of the charging station 100 and the power receiving device 200.

The charging station 100 according to the present embodiment has a signal source SG, a step-up transformer T1, and a pair of power transmission electrodes Eta and Ftp.

The signal source SG is formed by an inverter circuit that converts the DC voltage supplied from the AC adapter 300 into an AC voltage. The signal source SG generates the AC voltage at 100 kHz-10 MHz, for example. The inverter circuit has four field effect transistors (FETs) Q1, Q2, Q3, and Q4, resistances R1, R2, and R3, and a controller CONT.

A reference potential of the charging station 100 it connected to a ground line from the AC adapter 300. Accordingly, the reference potential of the charging station 100 can be set to the same potential as a ground potential at the output side of the AC adapter 300. In other words, the reference potential of the charging station 100 can be set.

The resistance R1 is a current detecting resistor for detecting the value of a current flowing in the four field effect transistors (FETs) Q1, Q2, Q3, and Q4. The resistances R2 and R3 voltage-divide the DC voltage supplied from the AC adapter 300. The controller CONT controls the field effect transistors (FETs) Q1, Q2, Q3, and Q4 to turn on and off so that the AC voltage is outputted from the inverter circuit at a predetermined frequency and a predetermined voltage. Accordingly, the AC voltage is applied between input terminals of the step-up transformer T1 at the predetermined frequency and the predetermined voltage.

The step-up transformer T1 boosts the AC voltage generated by the signal source SG and applies the boosted AC voltage between the pair of power transmission electrodes Eta and Etp via a leakage inductance L1 of the step-up transformer T1. Although the step-up transformer T1 is an isolating transformer in which a primary-side winding and a secondary-side winding are isolated, capacitances Cag and Cpg are present between the primary-side winding and the secondary-side winding. The capacitance Cag is a parasitic capacitance produced between the windings of the isolating transformer, and the capacitance Cpg is a parasitic capacitance produced between the windings of the isolating transformer.

The power transmitting electrode Eta constitutes a power transmitting-side active electrode, and the power transmitting electrode Etp constitutes a power transmitting-side passive electrode. A higher potential is applied to the power transmitting-side active electrode than to the power transmitting-side passive electrode. The electrodes in the pair of power transmission electrodes Eta and Etp constitute a capacitor C11 and a capacitor C12, respectively, for the reference potential of the charging station 100 (reference electrode). In other words, the power transmitting electrode (power transmitting-side passive electrode) Etp is not directly connected to the reference potential of the charging station 100.

The power receiving device 200 according to the present embodiment has a pair of power receiving electrodes Era and Erp, a power receiving-side reference potential electrode Err, a step-down transformer T2, a rectifier circuit REC, a DC-DC converter CONV, and a load circuit LD.

The power receiving electrode Era constitutes a power receiving-side active electrode, and the power receiving electrode Erp constitutes a power receiving-side passive electrode. In the case where a higher potential is applied to the power transmitting-side active electrode than to the power transmitting-side passive electrode, a higher potential is induced in the power receiving-side active electrode than in the power receiving-side passive electrode. The electrodes in the pair of power receiving electrodes Era and Erp constitute a capacitor C21 and a capacitor C22, respectively, for the reference potential of the power receiving device 200 (reference electrode). In other words, the power receiving electrode (power receiving-side passive electrode) Erp is not directly connected to the reference potential of the power receiving device 200.

When the power transmitting electrode (power transmitting-side active electrode) Eta and the power receiving electrode (power receiving-side active electrode) Era are opposing each other, a coupling capacity Caa is produced between the power transmitting electrode (power transmitting-side active electrode) Eta and the power receiving electrode (power receiving-side active electrode) Era, and a coupling capacity Cpp is produced between the power transmitting electrode (power transmitting-side passive electrode) Etp and the power receiving electrode (power receiving-side passive electrode) Erp. When the power transmitting electrode (power transmitting-side active electrode) Eta and the power receiving electrode (power receiving-side active electrode) Era are opposing each other, the AC voltage boosted by the step-up transformer T1 is applied between the pair of power transmission electrodes Eta and Etp of the charging station 100, which induces an AC voltage between the pair of power receiving electrodes Era and Erp of the power receiving device 200. Through this, power can be transmitted from the charging station 100 to the power receiving device 200.

Note that the capacitor C11 and the capacitor C12 of the charging station 100 and the inductor L1 of the charging station 100 constitute a serial resonance circuit. The capacitor C21 and the capacitor C22 of the power receiving device 200 and an inductor L2 constitute a parallel resonance circuit. Meanwhile, in the present embodiment, when the power transmission electrodes Eta and Etp of the charging station 100 are opposing the power receiving electrodes Era and Erp of the power receiving device 200, respectively, a composite resonance circuit that includes tie serial resonance circuit of the charging station 100 and the parallel resonance circuit of the power receiving device 200 is formed via a coupling capacity Cm (combined capacity) between the power transmission electrodes Eta and Etp and the power receiving electrodes Era and Erp, respectively.

The step-down transformer 12 steps down the AC voltage induced between the pair of power receiving electrodes Era and Erp, and applies the stepped-down AC voltage to the full wave rectifier circuit REC. The step-down transformer T2 has the inductor L2 between input terminals. In the present example, the inductor L2 is formed by an excitation inductance of a primary winding of the step-down transformer T2. The step-down transformer T2 is an isolating transformer in which a primary-side winding and a secondary-side winding are isolated.

The rectifier circuit REC has a diode bridge, formed by a plurality of diodes D1, D2, D3, and D4, and a capacitor C3; the rectifier circuit REC converts an AC voltage applied between a pair of input terminals into a DC voltage and applies the DC voltage between input terminals of the DC-DC converter CONV.

The DC-DC converter CONV converts the DC voltage outputted from the rectifier circuit REC into a predetermined DC voltage, for example a DC voltage suited to the load circuit LD, and outputs the DC voltage.

The load circuit LD uses the DC voltage outputted from the DC-DC converter CONV to execute a predetermined function provided in the load circuit LD. The load circuit LD includes an electrostatic capacitive detection-type touch panel, and executes the predetermined function based on an input made by a user to the touch panel.

Note that the step-up transformer T1 and the step-down transformer T2 are not required in electric field coupling-type power transmission systems. Furthermore, the rectifier circuit REC and the DC-DC converter CONV are not required in the case where the load circuit LD is an AC load circuit. Note that when power is transmitted while the pair of power transmission electrodes Eta and Etp of the charging station 100 and the pair of power receiving electrodes Era and Erp of the power receiving device 200 are in a predetermined opposing state, the intensity of the electric field between the pair of power transmission electrodes Eta and Etp of the charging station 100 and the pair of power receiving electrodes Era and Erp of the power receiving device 200 can be increased in the case where the step-up transformer T1 is provided in the charging station 100 and the step-down transformer T2 is provided in the power receiving device 200. The amount of power transmitted between the charging station 100 and the power receiving device 200 can be increased as well.

1-2. Reference Potential Stabilizing Circuit

In the present embodiment, a reference potential stabilizing circuit 110 is provided for stabilizing the reference potential of the power receiving device 200.

The reference potential stabilizing circuit 110 has a stabilizing electrode Ets provided on the charging station 100 side, and a charge controller. Specifically, the charge controller is formed by a reactance circuit that has an inductor Ls and a reactance element X. The reactance element X is an element having at least one of an inductor and a capacitor.

The stabilizing electrode Ets is, when the power receiving device 200 is placed on the charging station 100, disposed so as to oppose the power receiving-side reference potential electrode Err connected to the reference potential (reference electrode) the power receiving device 200. When the stabilizing electrode Ets and the electrode Err connected to the reference potential of the power receiving device 200 are opposing each other, a capacity Csr is produced between the stabilizing electrode Ets and the electrode Err connected to the reference potential of the power receiving device 200. At this time, the capacity Csr is connected to the inductor Ls and the reactance element X in series. This serial-connected circuit constitutes a serial resonance circuit that produces a series resonance at a predetermined frequency.

Figure 3:
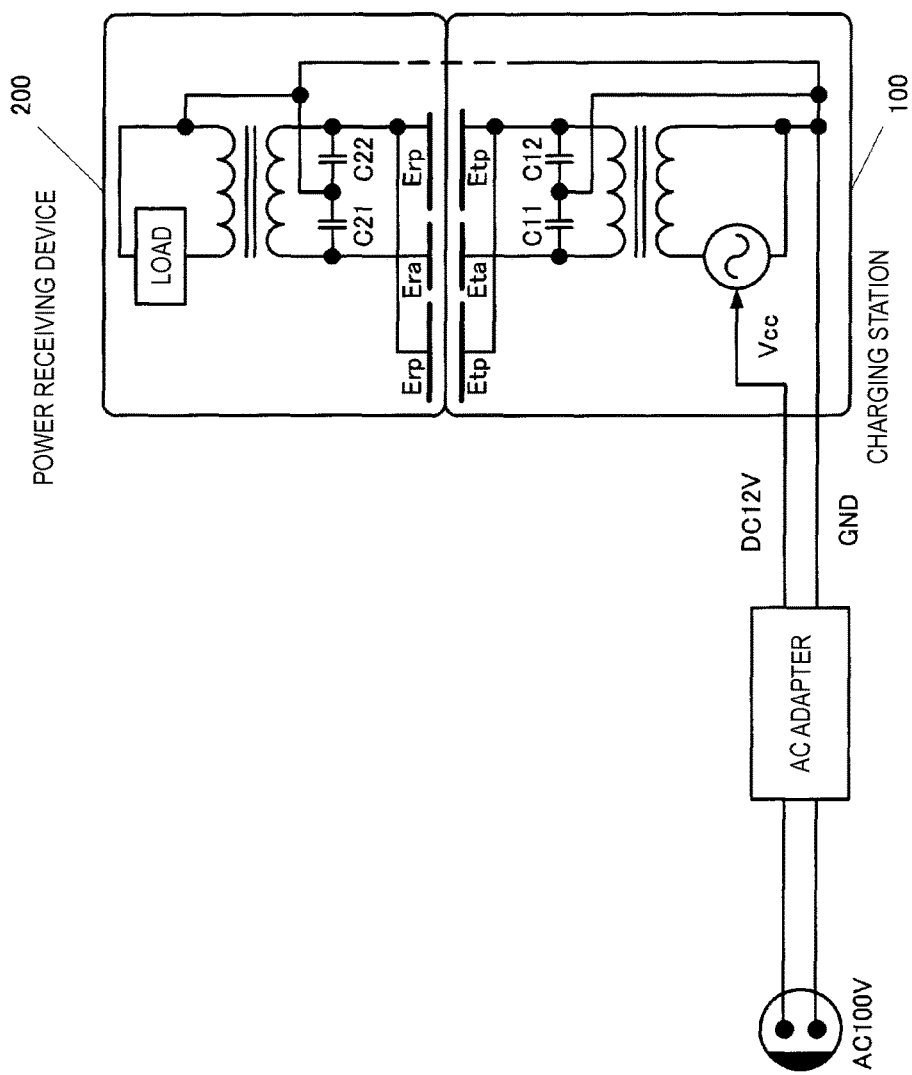
FIG. 3 is a diagram illustrating an effect of a power transmission system according to the first embodiment of the present invention.

When an operating frequency matches a series resonant frequency, a difference between the reference potential of the charging station 100 and a potential of the electrode Err connected to the reference potential of the power receiving device 200 (the reference potential of the power receiving device 200) drops to a minimum. In the case where the reference potential stabilizing circuit 110 does not have a resistance component, the power transmitting-side reference potential and the power receiving-side reference potential match. In other words, the state is equivalent to a state in which the power transmitting-side reference potential and the power receiving-side reference potential are connected, as illustrated in FIG. 3. At this time, if the power transmitting-side reference potential is a ground potential, the power receiving-side reference potential is also equivalent to the ground potential.

In the present embodiment, a frequency at which a combined reactance of the capacitance Csr produced between the power receiving-side reference potential electrode Err connected to the reference potential of the power receiving device 200 and the stabilizing electrode Ets, and the reactance of the reactance element (the inductor Ls and the reactance element X), is minimum, is taken as a frequency of an alternating current signal emitted from the signal source SG.

By providing the reference potential stabilizing circuit 110 in this manner, the present embodiment achieves the following effects.

The power receiving electrode Err of the power receiving device 200 capacitively couples with the stabilizing electrode Ets of the charging station 100, or in other words, capacitively couples with the reference potential (reference electrode) of the charging station 100, and thus the reference potential of the power receiving device 200 can be set (can be set to match a around potential). Through this, noise caused by fluctuations in the reference potential of the power receiving device 200 can be reduced. Accordingly, the power receiving device 200, such as an electrostatic capacitive-type input device, can be operated correctly even while placed on the charging station 100 and charging.

Meanwhile, if a power receiving-side shield conductor is provided and connected to the power receiving-side reference potential electrode Err, a potential of the power receiving-side shield conductor can be set. Through this, noise caused by fluctuations in the potential of the power receiving device 200 can be further reduced.

Meanwhile, although the step-up transformer T1 and the step-down transformer T2 are both isolation types in the present embodiment, it is sufficient for at least one to be an isolation transformer. The charge controller is capable of control that suppresses fluctuations in the reference potential of the power receiving device 200 with respect to AC if the reference potential of the charging station 100 and the reference potential of the power receiving device 200 are isolated with respect to DC.

Furthermore, in the present embodiment, the reference potential stabilizing circuit 110 is not disposed in series in the power transmission system, and thus does not easily affect the power transmission system. As such, a drop in the efficiency of transmission caused by the reference potential stabilizing circuit 110 can be reduced. Accordingly, the reference potential stabilizing circuit 110 can be additionally provided independent from the power transmission system (an example of additionally providing this circuit will be described in a fifth embodiment).

In addition, because the reference potential stabilizing circuit 110 is formed of a serial resonance circuit, the coupling between the power receiving electrode Err of the power receiving device 200 and the stabilizing electrode Ets of the charging station 100 can be strengthened. Accordingly, a surface area of the stabilizing electrode Ets of the charging station 100 can be reduced as compared to a case where serial resonance is not used.

2. Conclusion

The power transmission system according to the first embodiment of the present invention includes the charging station 100 (power transmitting apparatus) and the power receiving device 200 (power receiving apparatus). The charging station 100 has a pair of first electrodes Eta and Etp, and the signal source SG that emits an alternating current signal; and the step-up transformer T1 that steps up a voltage of the alternating current signal emitted from the signal source SG and applies the stepped-up alternating current signal to the pair of first electrodes Eta and Etp. The power receiving device 200 has at least a pair of second electrodes Era and Erp opposite to and that capacitively couple with the respective first electrodes Eta and Etp; the step-down transformer 12 that steps down an AC voltage produced between the at least pair of second electrodes Era and Erp; a rectifying and smoothing circuit REC that rectifies and smoothes the AC voltage stepped down by the step-down transformer T2; and a load circuit LD that is connected to the rectifying and smoothing circuit REC and to which power received from the power transmitting apparatus is supplied. Here, the charging station 100 further has a potential stabilizing electrode Ets that capacitively couples with the electrode Erp connected to a reference potential of the power receiving device 200; at least one of the step-up transformer T1 and the step-down transformer T2 is an isolation transformer; and the potential stabilizing electrode Ets is connected to a reference potential of the charging station 100 via a charge controller.

Through this, the reference potential of the power receiving apparatus can be set to be almost equal to the reference potential of the power transmitting apparatus even during power transmission operations. Accordingly, in an electric field coupling-type power transmission system, when the power receiving device 200 (power receiving apparatus) is placed on the charging station 100 (power transmitting apparatus) and power is being transmitted, the power receiving device 200 can be caused to operate correctly even in the case where the touch panel provided in the power receiving device 200 has been manipulated.

Second Embodiment

Hereinafter, a power transmission system according to a second embodiment of the present invention will be described in detail with reference to the drawings.

Figure 4:
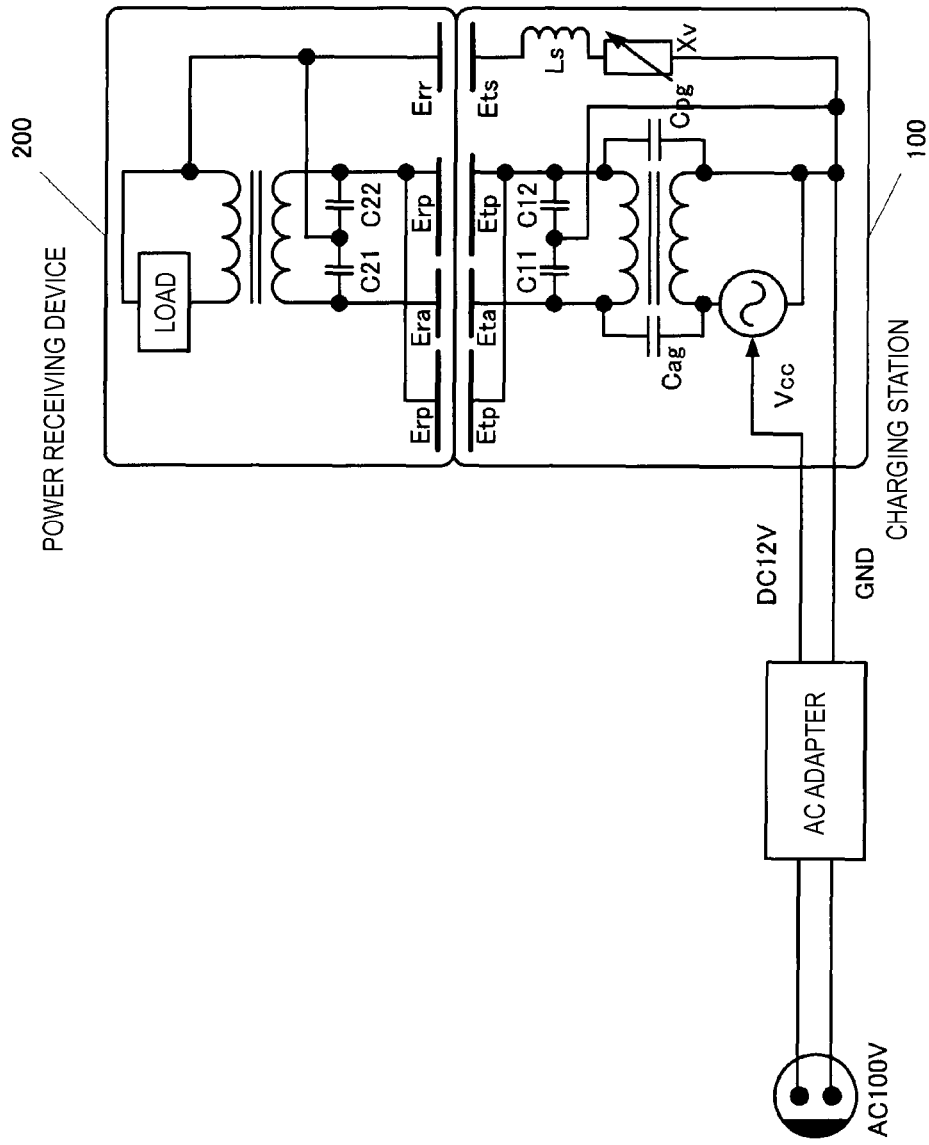
FIG. 4 is a diagram illustrating the configuration of a power transmission system according to a second embodiment of the present invention.
Figure 5:
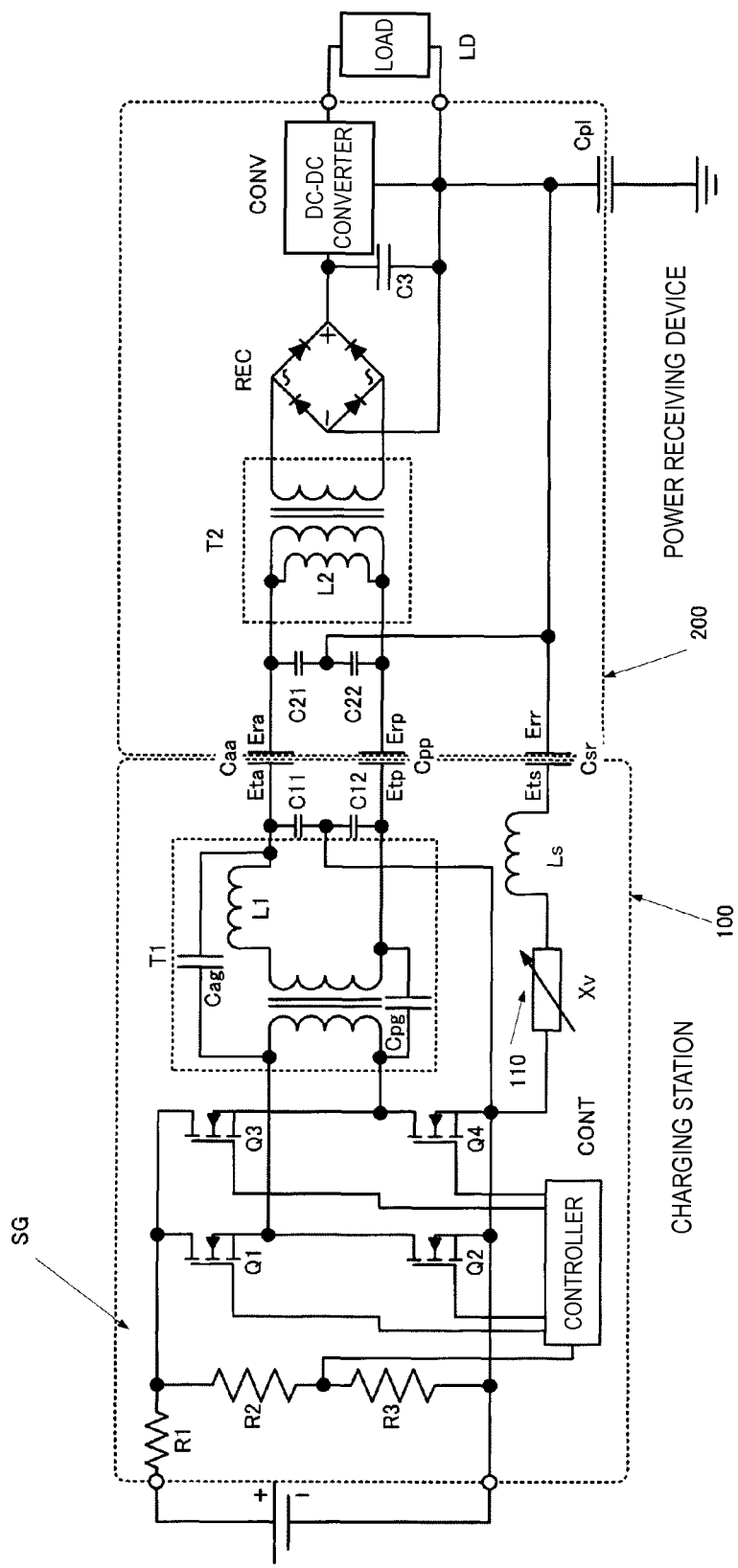
FIG. 5 is a diagram illustrating a specific circuit configuration of a power transmission system according to the second embodiment of the present invention.

FIG. 4 is a diagram illustrating the circuit configuration of the power transmission system according to the second embodiment. FIG. 5 is a diagram illustrating circuit configurations of a charging station 100 and a power receiving device 200. Note that elements that are the same as those in the first embodiment are given the same reference numerals.

The power transmission system according to the present embodiment employs a variable reactance element Xv instead of the reactance element X of the reference potential stabilizing circuit 110 according to the first embodiment. A variable capacity diode (varicap), a trimmer capacitor, or the like can be used as the variable reactance Xv. Other configurations are the same as in the first embodiment, and thus descriptions thereof will be omitted.

In addition to the effects of the first embodiment, according to the present embodiment, even in the case where the coupling capacity Csr between the stabilizing electrode Ets and the power receiving-side reference potential electrode Err connected to the reference potential of the power receiving apparatus changes due to positional skew or the like when the power receiving device 200 is placed on the charging station 100, adjusting the reactance of the variable reactance element Xv makes it possible to put the reference potential stabilizing circuit 110 in a state of series resonance. Through this, fluctuations in the reference potential of the power receiving device 200 can be suppressed.

It is also possible to automatically adjust the reactance of the variable reactance element Xv. A voltage at both ends of the inductor Ls reaches a maximum value during the state of series resonance. Accordingly, the reference potential stabilizing circuit 110 can be kept in the state of series resonance by adjusting the reactance of the variable reactance element Xv so that the voltage at both ends of the inductor Ls reaches the maximum value.

Third Embodiment

Hereinafter, a power transmission system according to a third embodiment of the present invention will be described in detail with reference to the drawings.

Figure 6:
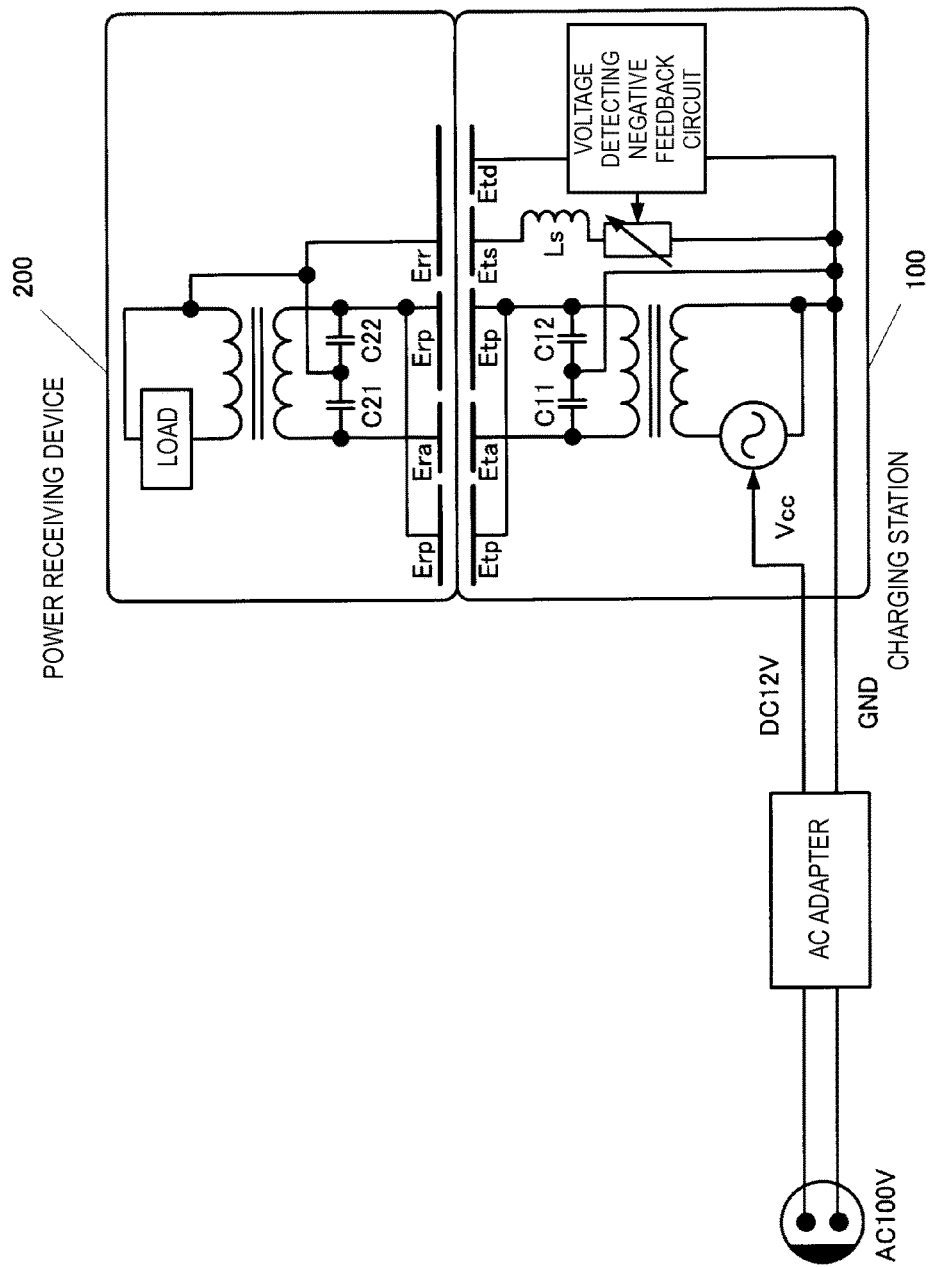
FIG. 6 is a diagram illustrating the configuration of a power transmission system according to a third embodiment of the present invention.
Figure 7:
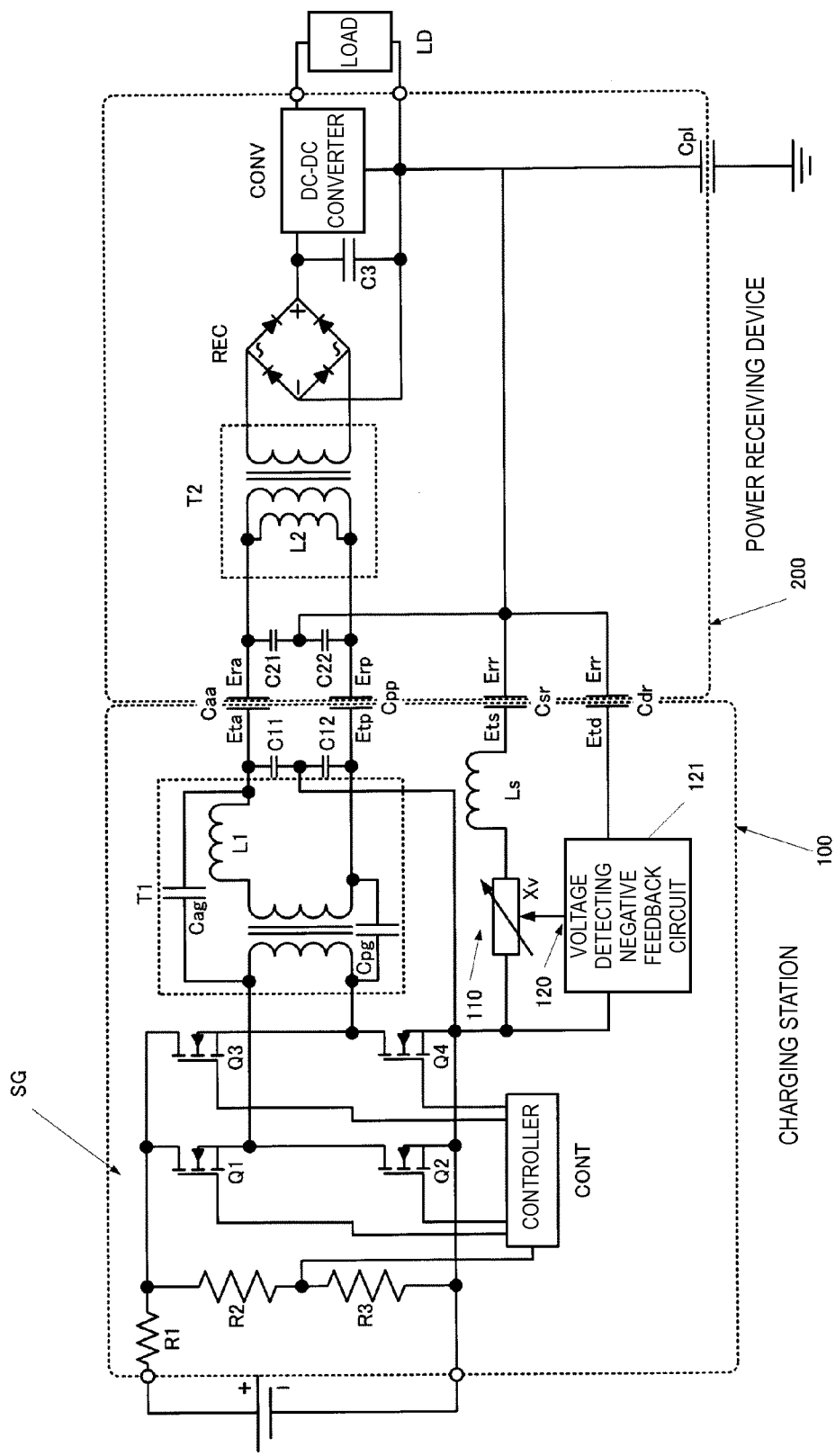
FIG. 7 is a diagram illustrating a specific circuit configuration of a power transmission system according to the third embodiment of the present invention.

FIG. 6 is a diagram illustrating the circuit configuration of the power transmission system according to the third embodiment. FIG. 7 is a diagram illustrating circuit configurations of a charging station 100 and a power receiving device 200. Note that elements that are the same as those in the first and second embodiments are given the same reference numerals.

In addition to the configuration of the second embodiment, the power transmission system according to the present embodiment further includes a reactance control circuit 120 for controlling the reactance of the variable reactance element Xv.

The reactance control circuit 120 is provided in the power transmitting apparatus. The reactance control circuit 120 has a potential detecting electrode Etd and a voltage detecting negative feedback circuit 121.

The potential detecting electrode Etd is, when the power receiving device 200 is placed on the charging station 100, disposed so as to oppose the power receiving-side reference potential electrode Err. In this opposing state, a capacity Cdr is produced between the potential detecting electrode Etd and the power receiving-side reference potential electrode Err. The potential detecting electrode Etd and the power receiving-side reference potential electrode Err couple via the capacity Cdr, and a voltage is induced in the potential detecting electrode Etd by the power receiving-side reference potential electrode Err.

The voltage detecting negative feedback circuit 121 detects a potential of the potential detecting electrode Etd, or in other words, indirectly detects a potential of the power receiving-side reference potential electrode Err connected to the reference potential of the power receiving device 200, and controls the reactance of the variable reactance element Xv in accordance with the detected potential of the power receiving-side reference potential electrode Err (the potential of the potential detecting electrode Etd). For example, the reactance of the variable reactance element Xv is controlled so that a fluctuation in the potential of the potential detecting electrode Etd is less than or equal to a predetermined value. Specifically, the predetermined value is a value at which the operation of the power receiving device 200 is not affected. The predetermined value may be 0.

In addition to the effects of the first and second embodiments, according to the present embodiment even, in the case where the coupling capacity Csr between the stabilizing electrode Ets and the power receiving-side reference potential electrode Err has changed due to positional skew or the like when the power receiving device 200 is placed on the charging station. 100, the reference potential stabilizing circuit 110 can automatically be placed in a state near series resonance by adjusting the reactance of the variable reactance element Xv. Through this, fluctuations in the reference potential of the power receiving device 200 can be suppressed in a stable manner.

Fourth Embodiment

Hereinafter, a power transmission system according to a fourth embodiment of the present invention will be described in detail with reference to the drawings.

Figure 8:
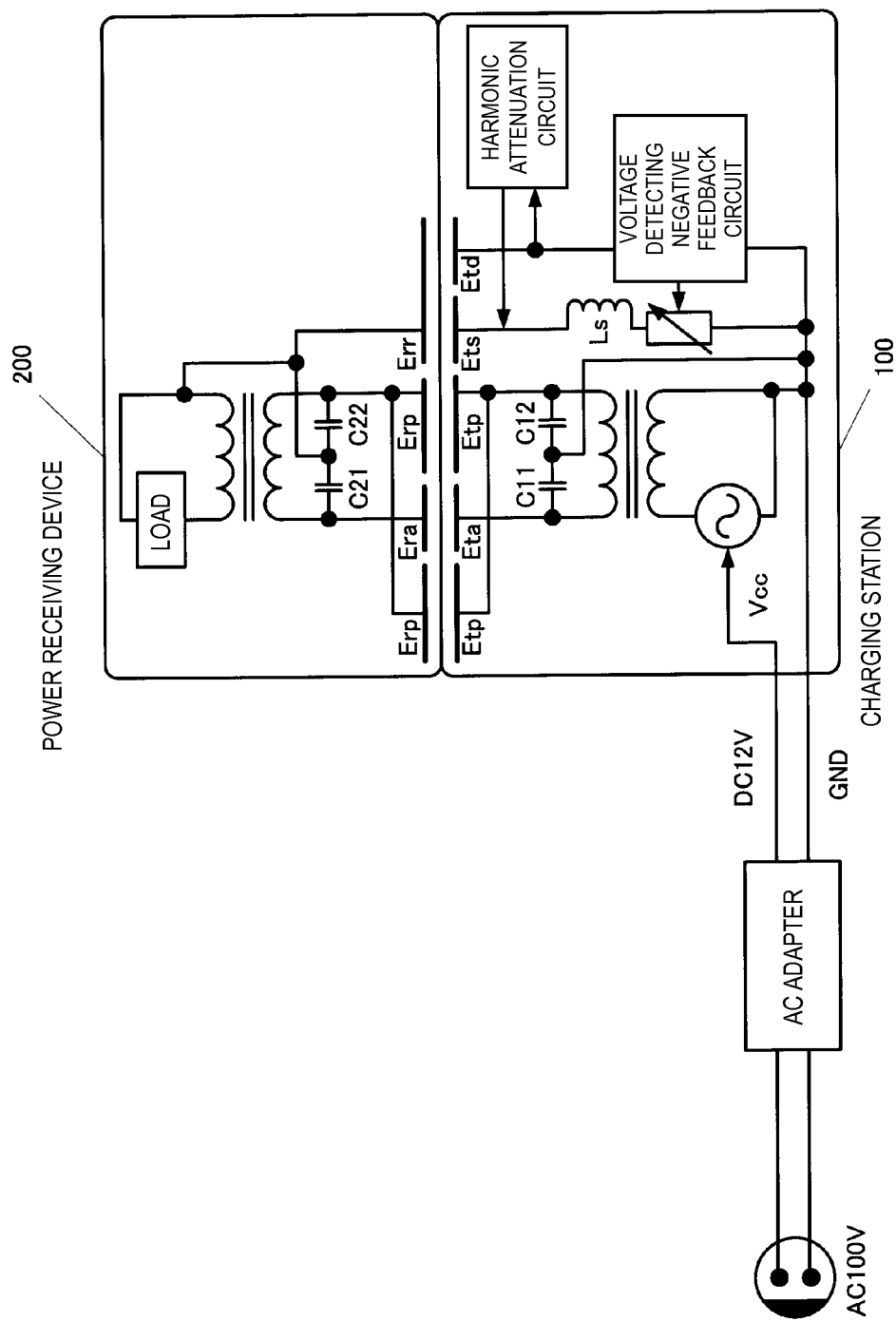
FIG. 8 is a diagram illustrating the configuration of a power transmission system according to a fourth embodiment of the present invention.
Figure 9:
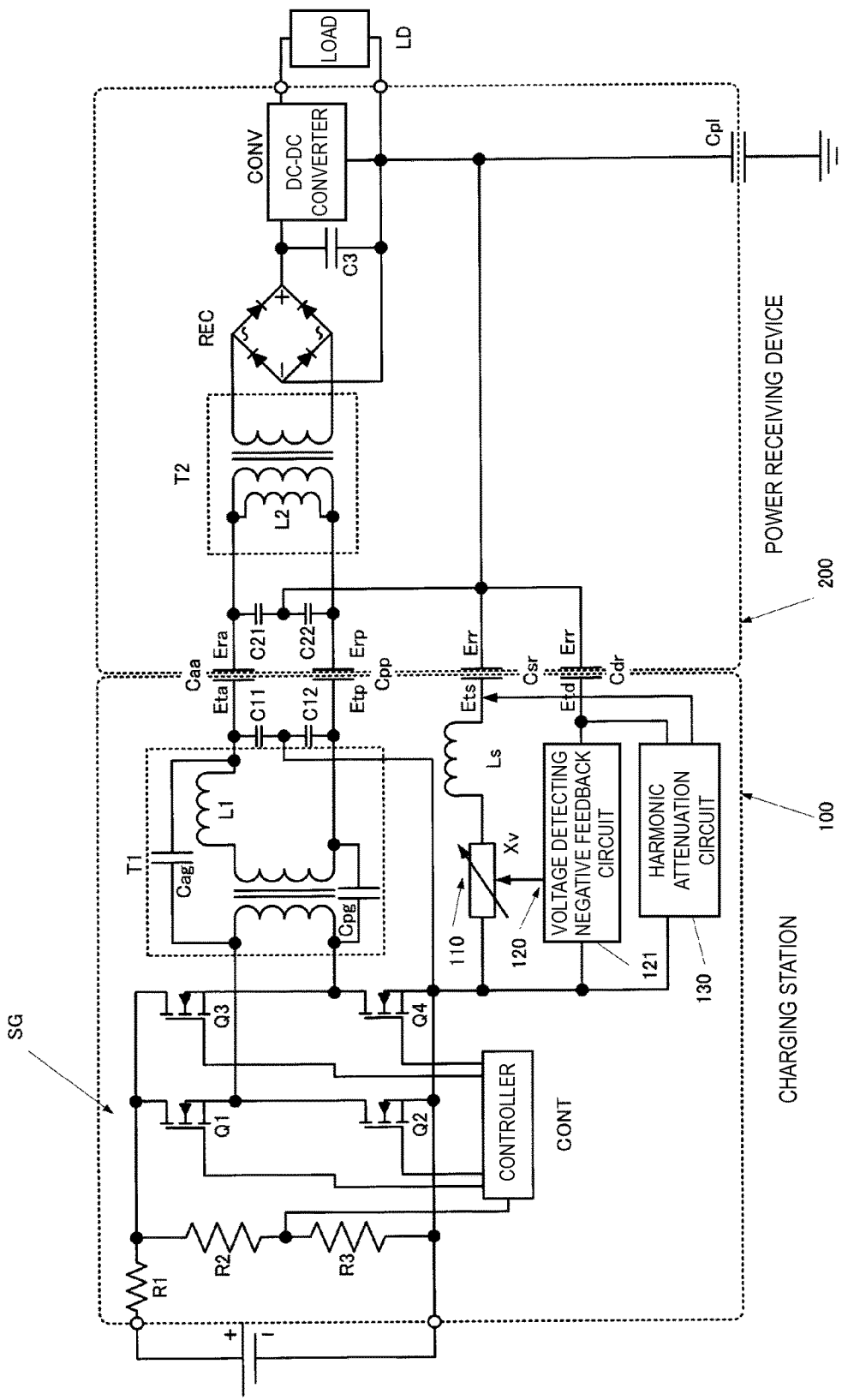
FIG. 9 is a diagram illustrating a specific circuit configuration of a power transmission system according to the fourth embodiment of the present invention.

FIG. 8 is a diagram illustrating the circuit configuration of a power transmission system according to a fourth embodiment. FIG. 9 is a diagram illustrating circuit configurations of a charging station 100 and a power receiving device 200. Note that elements that are the same as those in the first—third embodiments are given the same reference numerals.

In addition to the configuration of the third embodiment, the power transmission system according to the present embodiment includes a harmonic attenuation circuit 130 for attenuating a harmonic present in the transmitted power.

The harmonic attenuation circuit 130 is provided in the charging station 100. The harmonic attenuation circuit 130 detects a harmonic in a voltage waveform detected by the potential detecting electrode Etd, and by generating a signal whose phase is inverted relative to the detected harmonic, for example, and outputting that signal to the output side of the inductor Ls in the reference potential stabilizing circuit 110, attenuates a harmonic such as a third-order harmonic, a fifth-order harmonic, or the like. In other words, the harmonic attenuation circuit 130 detects a harmonic component of the reference potential on the power receiving device 200 side, adjusts an amplitude component thereof, and negatively feeds back the resultant to the stabilizing electrode Ets.

In addition to the effects of the first-third embodiments, according to the present embodiment, a harmonic such as a third-order harmonic, a fifth-order harmonic, or the like, for example, can be attenuated. Although the reference potential stabilizing circuit 110 can suppress fluctuations in the reference potential of the power receiving device 200 near a driving frequency, the suppression effect decreases in other frequency bands. According, to the present embodiment, fluctuations in the reference potential of the power receiving device 200 in other frequencies can be suppressed by the harmonic attenuation circuit 130. Accordingly, a further stabilization of the reference potential of the power receiving device 200 can be achieved.

Note that the voltage detecting negative feedback circuit 121 is not required to achieve the effect of the present embodiment. Furthermore, the reactance element need not be a variable reactance element.

Fifth Embodiment

Hereinafter, a power transmission system according to a fifth embodiment of the present invention will be described in detail with reference to the drawings.

Figure 10:
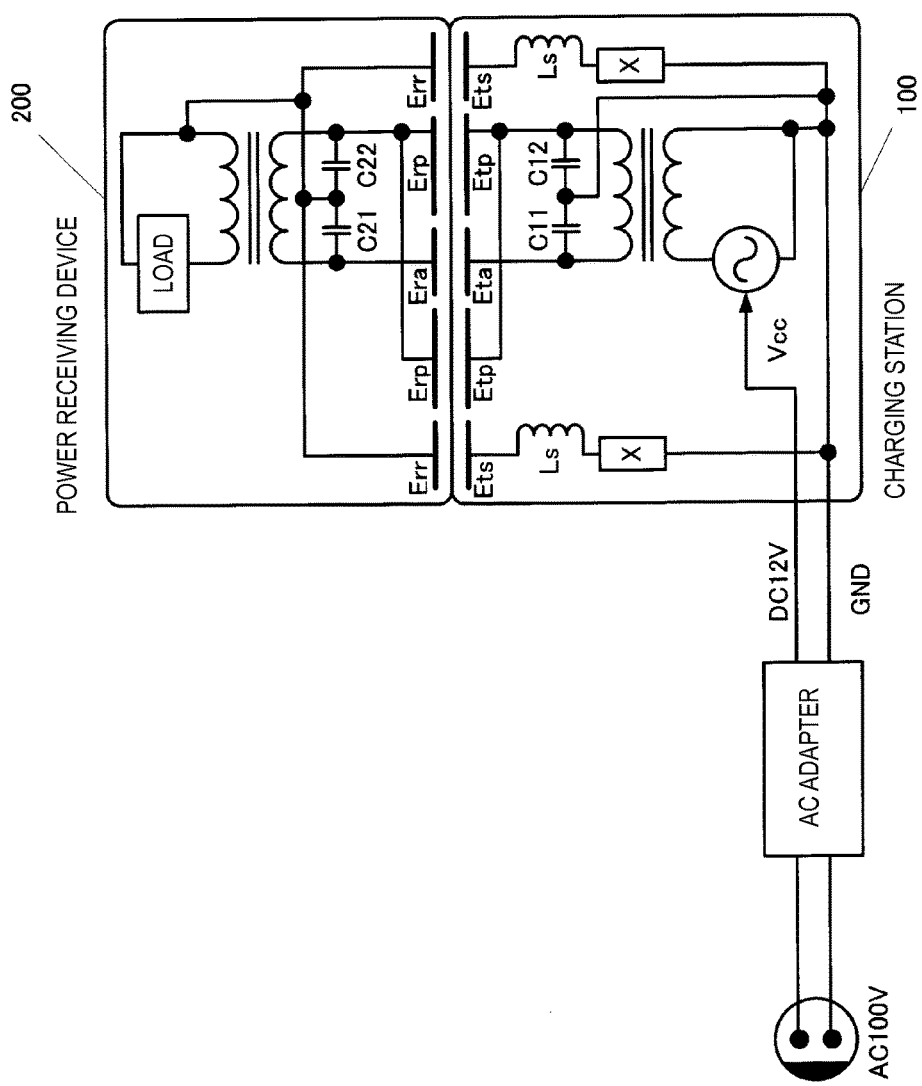
FIG. 10 is a diagram illustrating the configuration of a power transmission system according to a fifth embodiment of the present invention.
Figure 11:
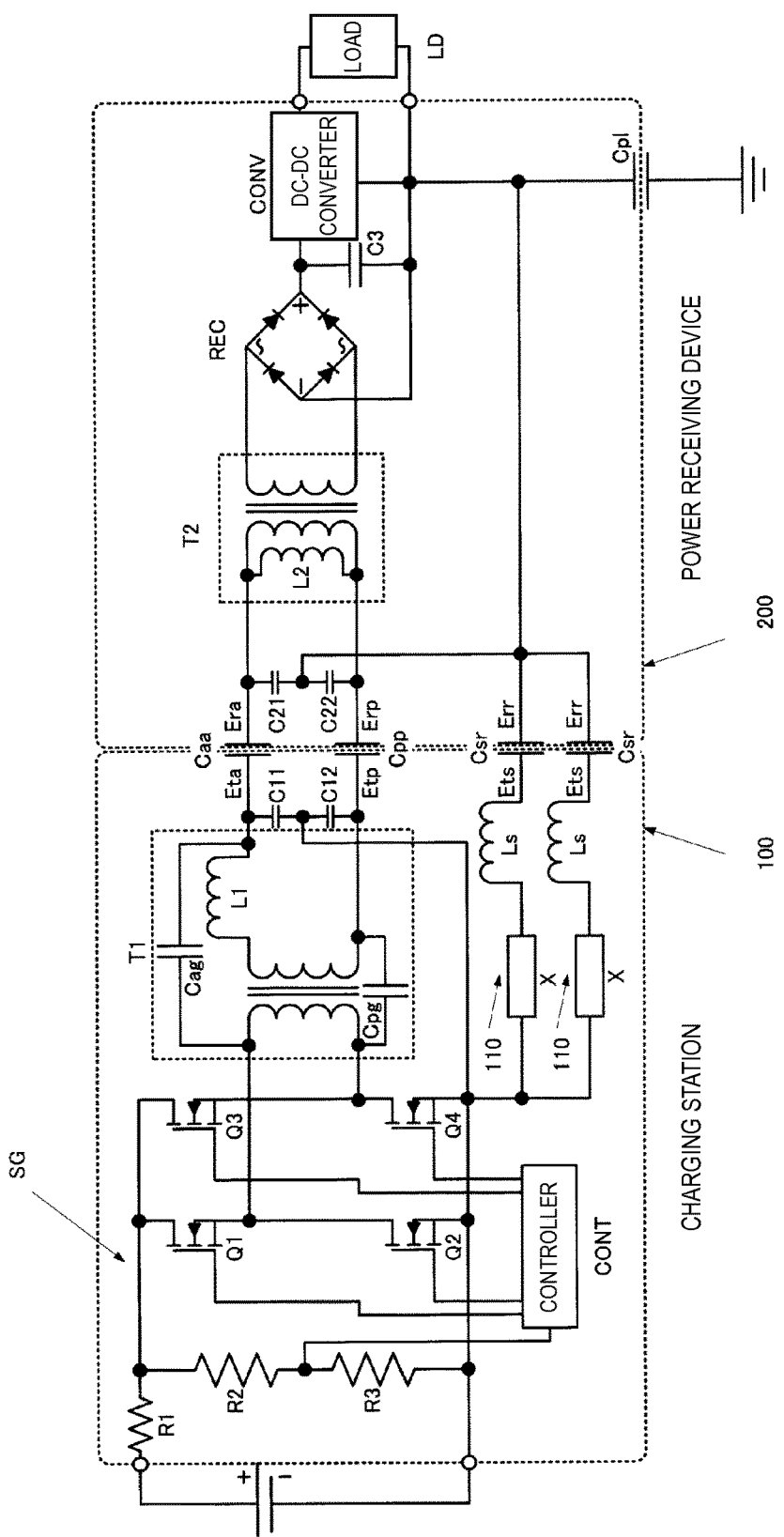
FIG. 11 is a diagram illustrating a specific circuit configuration of a power transmission system according to the fifth embodiment of the present invention.

FIG. 10 is a diagram illustrating the circuit configuration of a power transmission system according to a fifth embodiment. FIG. 11 is a diagram illustrating circuit configurations of a charging station 100 and a power receiving device 200. Note that elements that are the same as those in the first embodiment are given the same reference numerals.

In addition to the configuration of the first embodiment, the power transmission system according to the present embodiment further includes one additional reference potential stabilizing circuit 110. In other words, two reference potential stabilizing circuits 110 are provided on the charging station 100 side. Rather than two, a plurality, namely three or more, reference potential stabilizing circuits 110 may be provided on the charging station 100 side.

Figure 12:
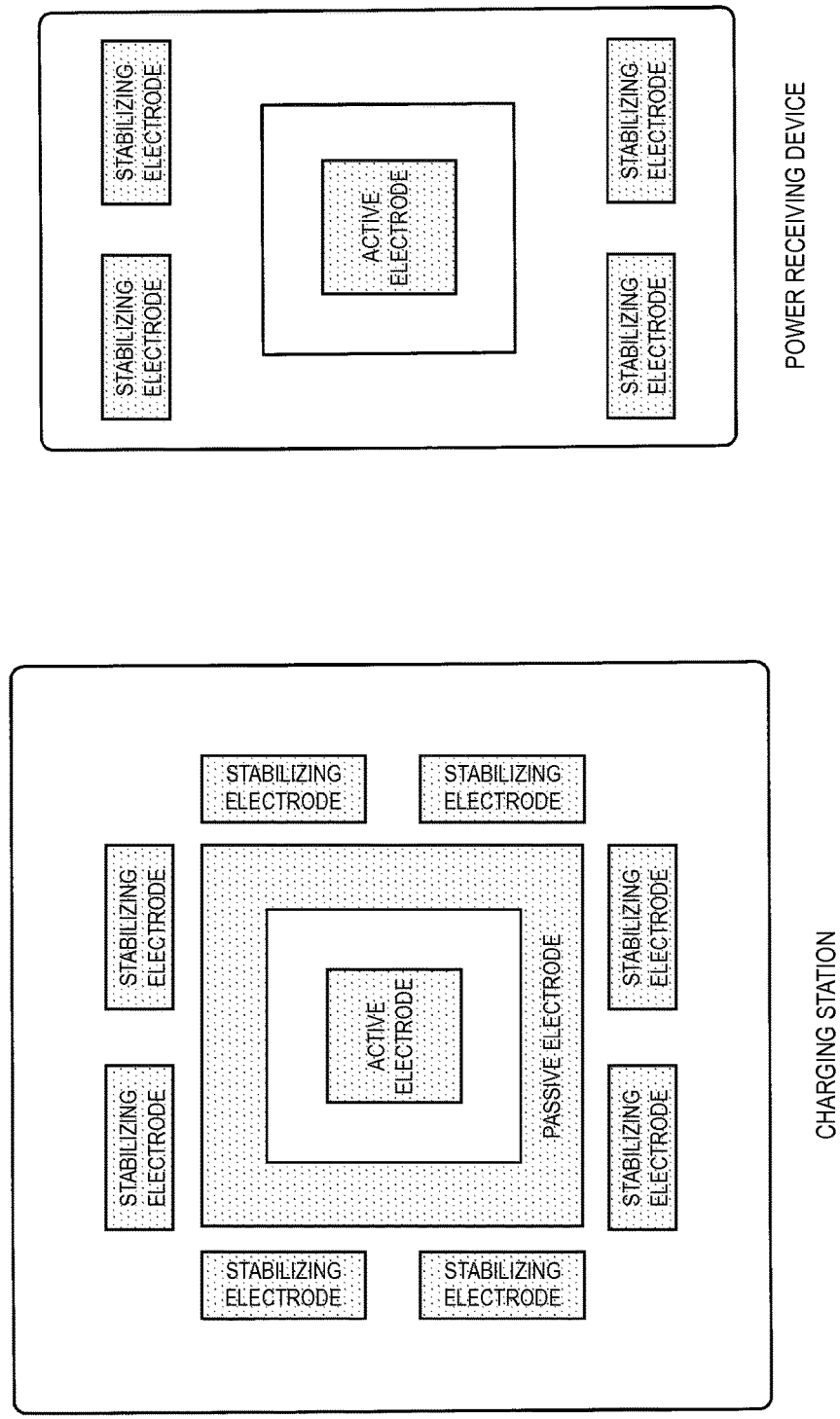
FIG. 12 is a diagram illustrating an electrode arrangement in a power transmission system according to the fifth embodiment of the present invention.

FIG. 12 is a diagram illustrating an electrode arrangement in the power transmission system according to the fifth embodiment of the present invention. In the present example, eight reference potential stabilizing circuits 110 are provided. Accordingly, eight stabilizing electrodes Ets are also provided. In the present example, the power transmitting electrode (power transmitting-side active electrode) Eta is disposed in a center of the charging station 100, and the power transmitting electrode (power transmitting-side passive electrode) Etp is disposed so as to surround the power transmitting electrode (power transmitting-side active electrode) Eta. The stabilizing electrodes Ets are disposed uniformly in the periphery of the power transmitting electrode (power transmitting-side passive electrode) Etp. Although not illustrated, an electrode connected to the reference potential of the charging station 100 may be disposed in the periphery of the stabilizing electrodes as a guard electrode.

In the case where the power transmitting electrode (power transmitting-side active electrode) Eta, the power transmitting electrode (power transmitting-side passive electrode) Etp, and the stabilizing electrodes Ets are disposed in this manner, the power receiving electrode (power receiving-side passive electrode) Erp of the power receiving device 200 overlaps with the power transmitting electrode (power transmitting-side passive electrode) Etp of the charging station 100 when the power receiving device 200 is disposed vertically, for example, so that the positions of the power receiving electrode (power receiving-side active electrode) Era thereof and the active electrode of the charging station 100 match. Meanwhile, the power receiving-side reference potential electrode Err of the power receiving device 200 overlaps with the top two stabilizing electrodes Ets and the bottom two stabilizing electrodes Ets of the stabilizing electrodes Ets in the charging station 100 as illustrated in FIG. 12, but does not overlap with the left two stabilizing electrodes Ets and the right two stabilizing electrodes Ets. At this time, the top two reference potential stabilizing circuits 110 and the bottom two reference potential stabilizing circuits 110 undergo series resonance with the power receiving device 200, but the left two reference potential stabilizing circuits 110 and the right two reference potential stabilizing circuits 110 do not operate because there is no opposing power receiving-side reference potential electrode Err. Accordingly, a fluctuating electric field is suppressed from arising in the left two stabilizing electrodes Ets and the right two stabilizing electrodes Ets. In other words, it is difficult to produce noise to the exterior.

Sixth Embodiment

Hereinafter, a power transmission system according to a sixth embodiment of the present invention will be described in detail with reference to the drawings.

Figure 13:
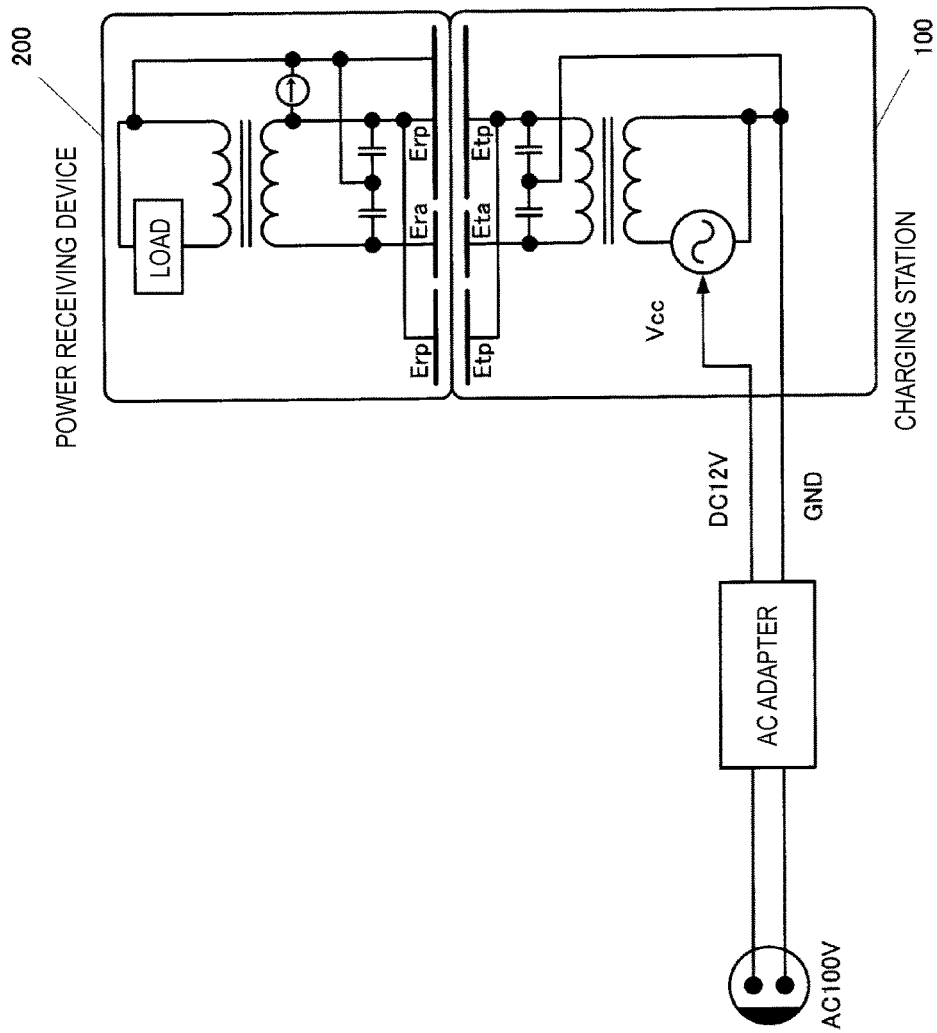
FIG. 13 is a diagram illustrating the configuration of a power transmission system according to a sixth embodiment of the present invention.
Figure 14:
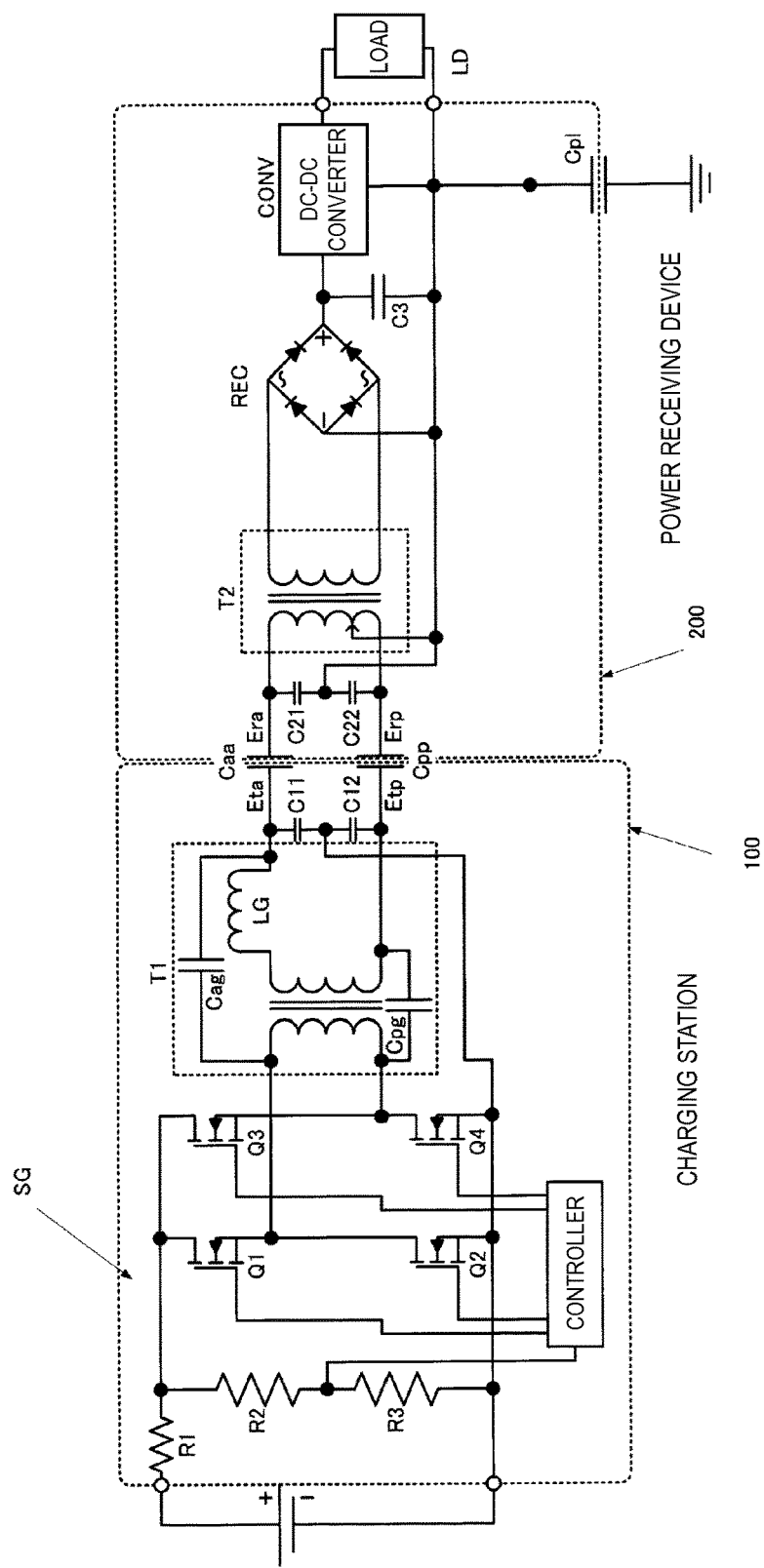
FIG. 14 is a diagram illustrating a specific circuit configuration of a power transmission system according to the sixth embodiment of the present invention.

FIG. 13 is a diagram illustrating the circuit configuration of a power transmission system according to the sixth embodiment. FIG. 14 is a diagram illustrating circuit configurations of a charging station 100 and a power receiving device 200. Note that elements that are the same as those in the first embodiment are given the same reference numerals.

The present embodiment differs from the power transmission system according to the first embodiment in the following ways. That is, the charge controller provided on the charging station 100 side in the first embodiment is provided on the power receiving device 200 side here. Specifically, instead of the reactance element X provided on the charging station 100 in the first embodiment, part of the winding of the step-down transformer T2 is used as the reactance element X by connecting an intermediate tap terminal of the primary winding in the step-down transformer T2 provided in the power receiving device 200 to the reference potential of the power receiving device 200. The reference potential of the power receiving device 200 can be set to the same potential as the reference potential of the charging station 100 by adjusting the intermediate tap terminal of the primary winding in the step-down transformer T2.

Seventh Embodiment

Hereinafter, a power transmission system according to a seventh embodiment of the present invention will be described in detail with reference to the drawings.

Figure 15:
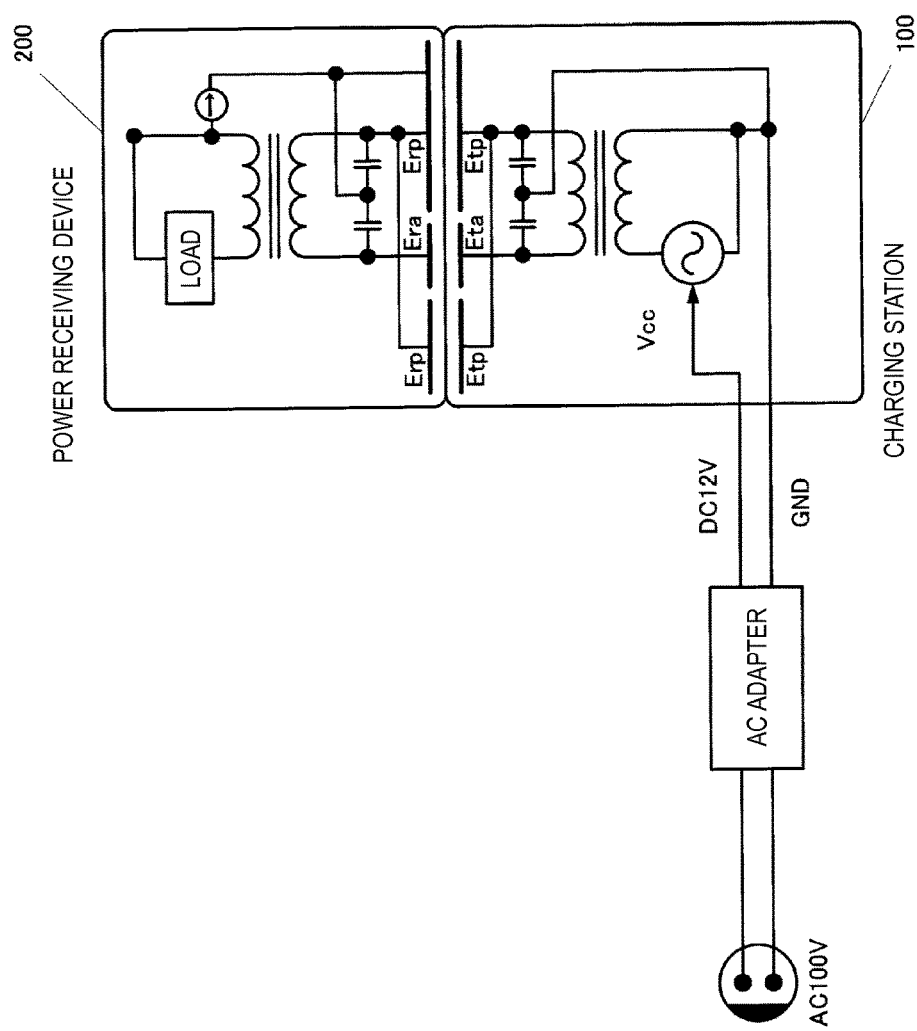
FIG. 15 is a diagram illustrating the configuration of a power transmission system according to a seventh embodiment of the present invention.
Figure 16:
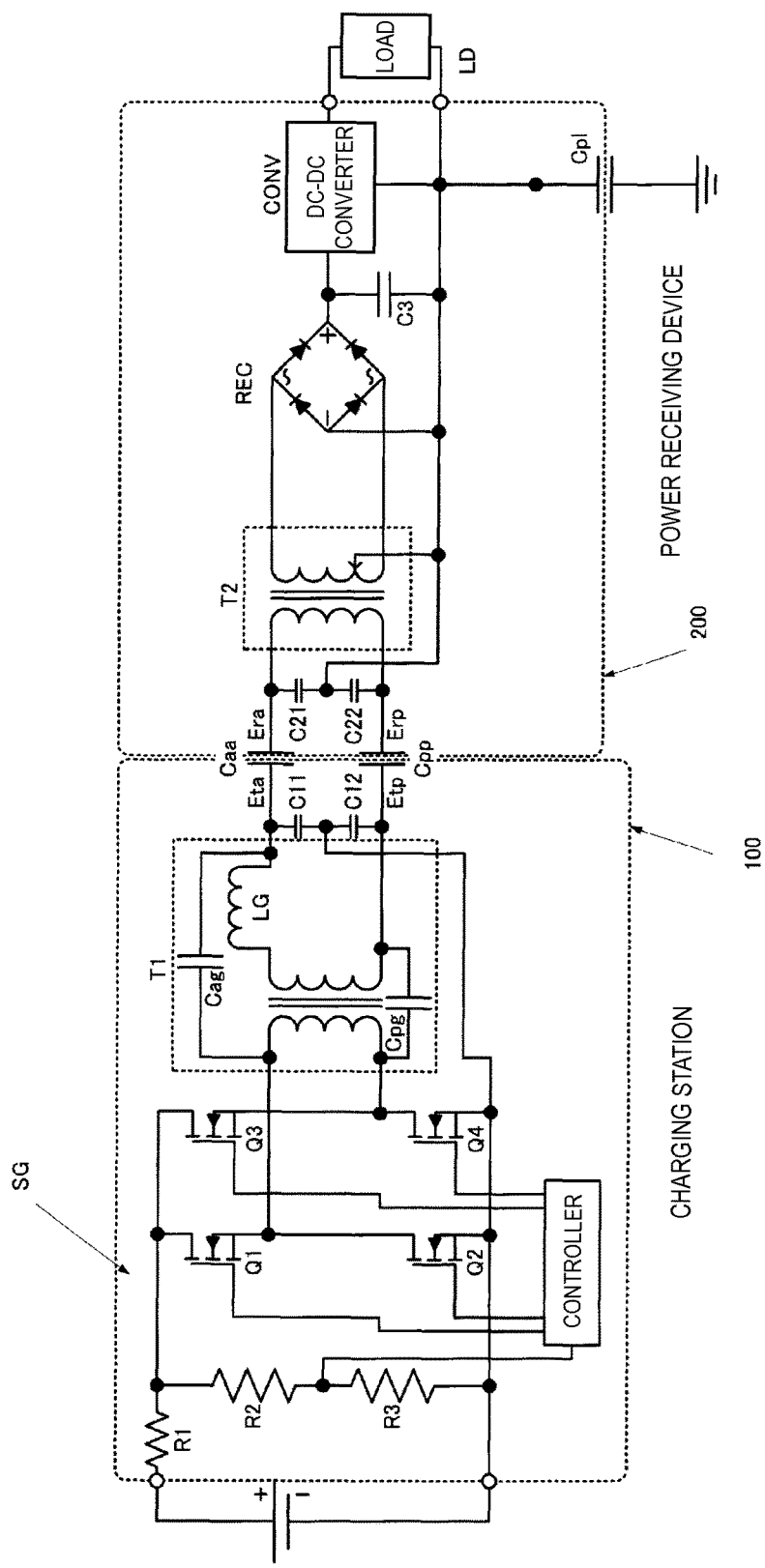
FIG. 16 is a diagram illustrating a specific circuit configuration of a power transmission system according to the seventh embodiment of the present invention.

FIG. 15 is a diagram illustrating the circuit configuration of the power transmission system according to the seventh embodiment. FIG. 16 is a diagram illustrating circuit configurations of a charging station 100 and a power receiving device 200. Note that elements that are the same as those in the first embodiment are given the same reference numerals.

The present embodiment differs from the power transmission system according to the sixth embodiment in the following ways. That is, the charge controller provided on the charging station 100 side in the first embodiment is provided on the power receiving device 200 side here. Specifically, instead of the reactance element X provided on the charging station 100 in the first embodiment, part of the winding of the step-down transformer T2 is used as the reactance element X by connecting an intermediate tap terminal of the secondary winding of the step-down transformer 12 provided in the power receiving device 200 to the reference potential of the power receiving device 200. The reference potential of the power receiving device 200 can be set to the same potential as the reference potential of the charging station 100 by adjusting the intermediate tap terminal of the secondary winding in the step-down transformer T2.

Eighth Embodiment

Hereinafter, a power transmission system according to an eighth embodiment of the present invention will be described in detail with reference to the drawings.

Figure 17:
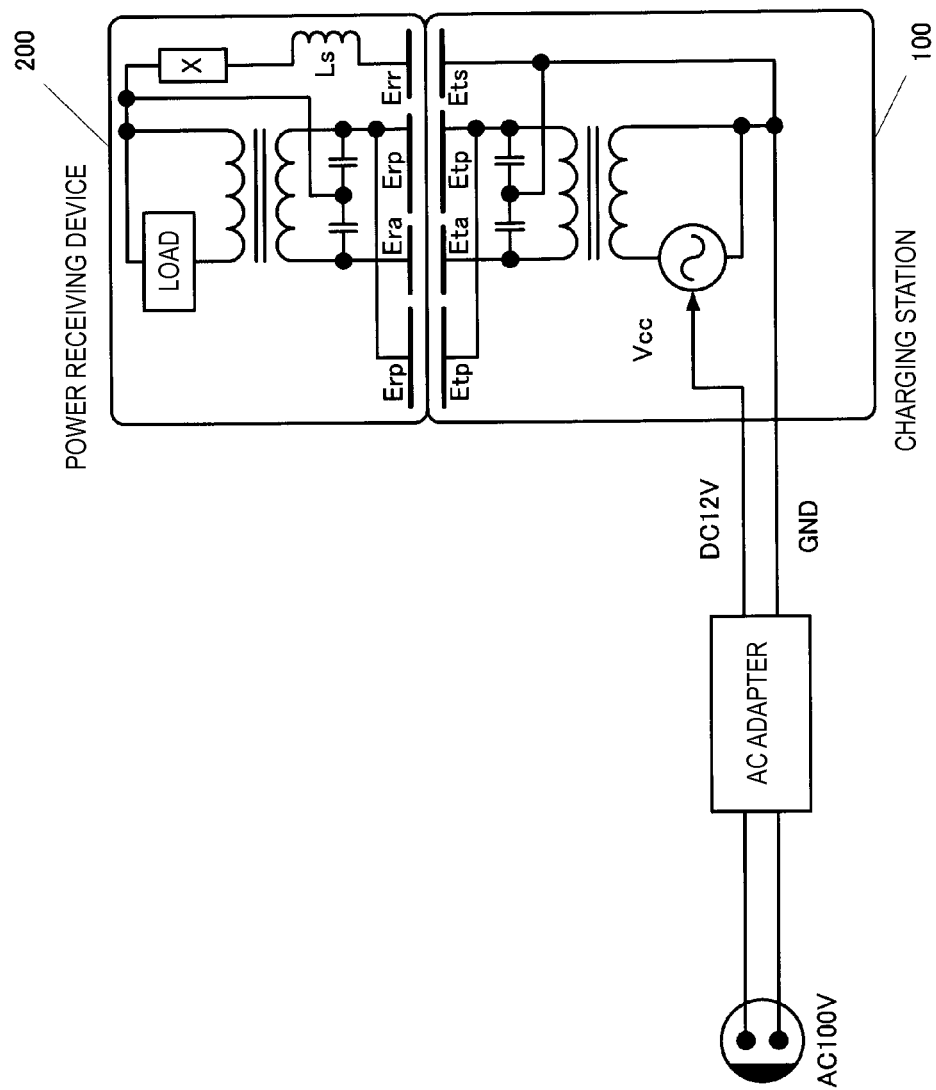
FIG. 17 is a diagram illustrating the configuration of a power transmission system according to an eighth embodiment of the present invention.
Figure 18:
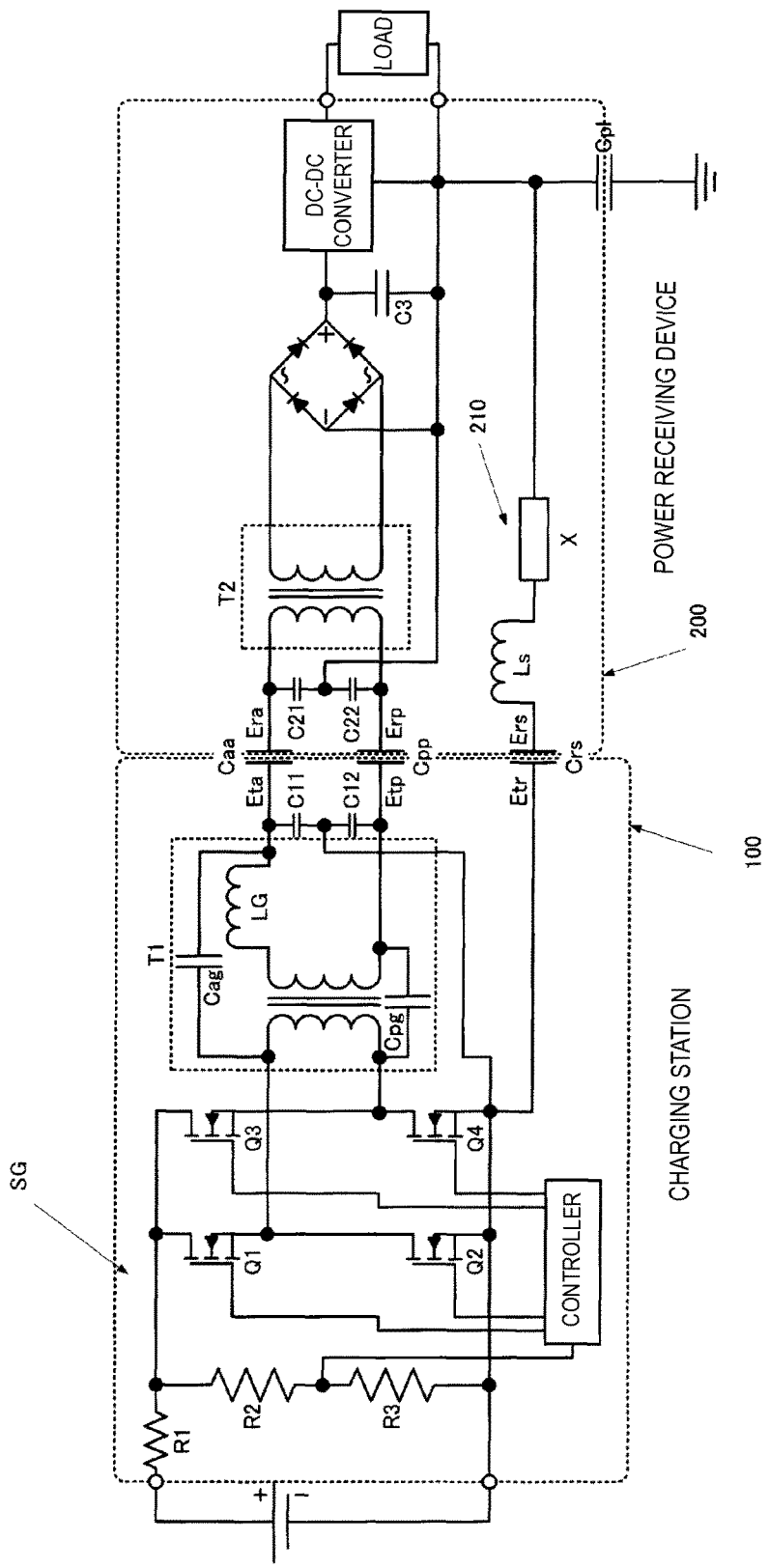
FIG. 18 is a diagram illustrating a specific circuit configuration of a power transmission system according to the eighth embodiment of the present invention.

FIG. 17 is a diagram illustrating the circuit configuration of the power transmission system according to the eighth embodiment. FIG. 18 is a diagram illustrating circuit configurations of a charging station 100 and a power receiving device 200. Note that elements that are the same as those in the first embodiment are given the same reference numerals.

The present embodiment differs from the power transmission system according to the first embodiment in the following ways. That is, the charge controller provided on the charging station 100 side in the first embodiment is provided on the power receiving device 200 side here. Specifically, although the reactance element X is provided on the charging station 100 in the first embodiment, the reactance element X is provided on the power receiving device 200 side here. That is, the charging station 100 includes a power transmitting-side reference potential electrode Etr connected to the reference potential of the charging station 100, and the power receiving device 200 includes a power receiving-side stabilizing electrode Ers connected to the reference potential of the power receiving device 200 via the reactance element X. A capacity Crs is formed between the power transmitting-side reference potential electrode Etr and the power receiving-side stabilizing electrode Ers. The same effects as in the first embodiment can be achieved by this configuration as well.

Ninth Embodiment

Hereinafter, a power transmission system according to a ninth embodiment of the present invention will be described in detail with reference to the drawings.

Figure 19:
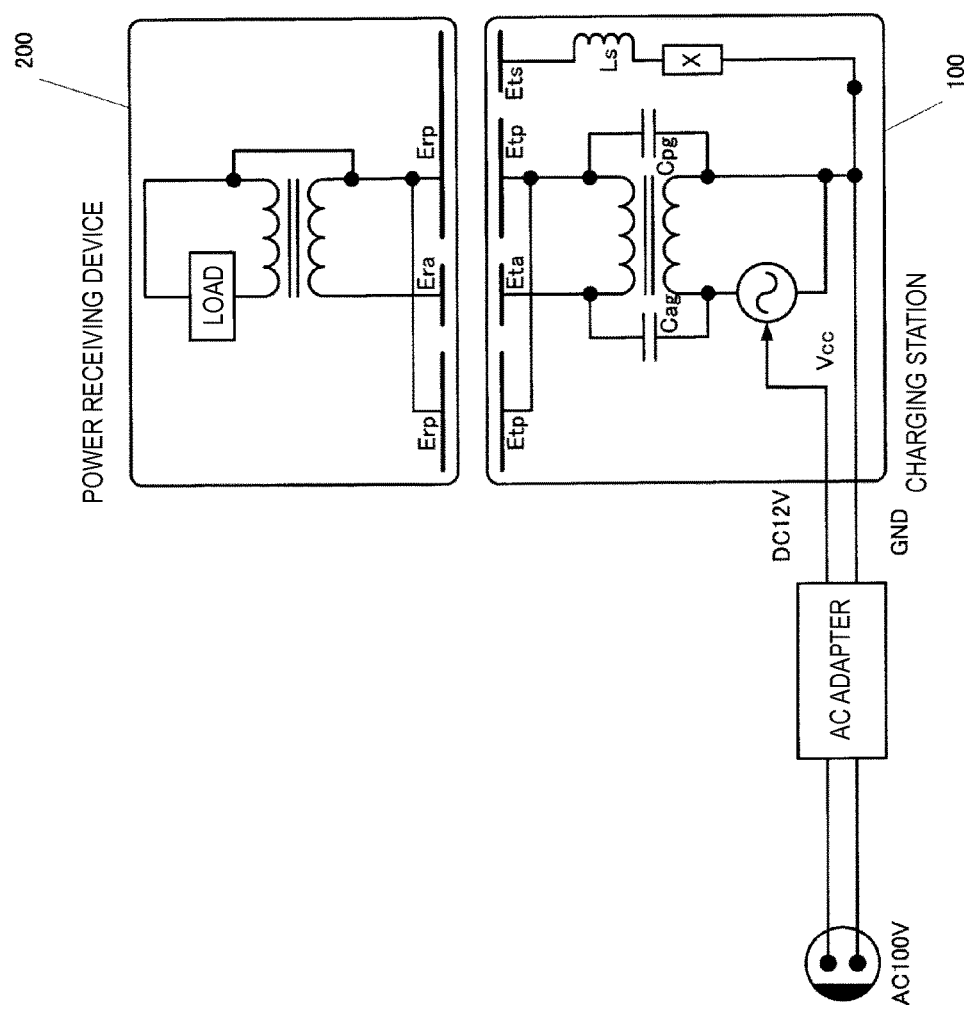
FIG. 19 is a diagram illustrating the configuration of a power transmission system according to a ninth embodiment of the present invention.
Figure 20:
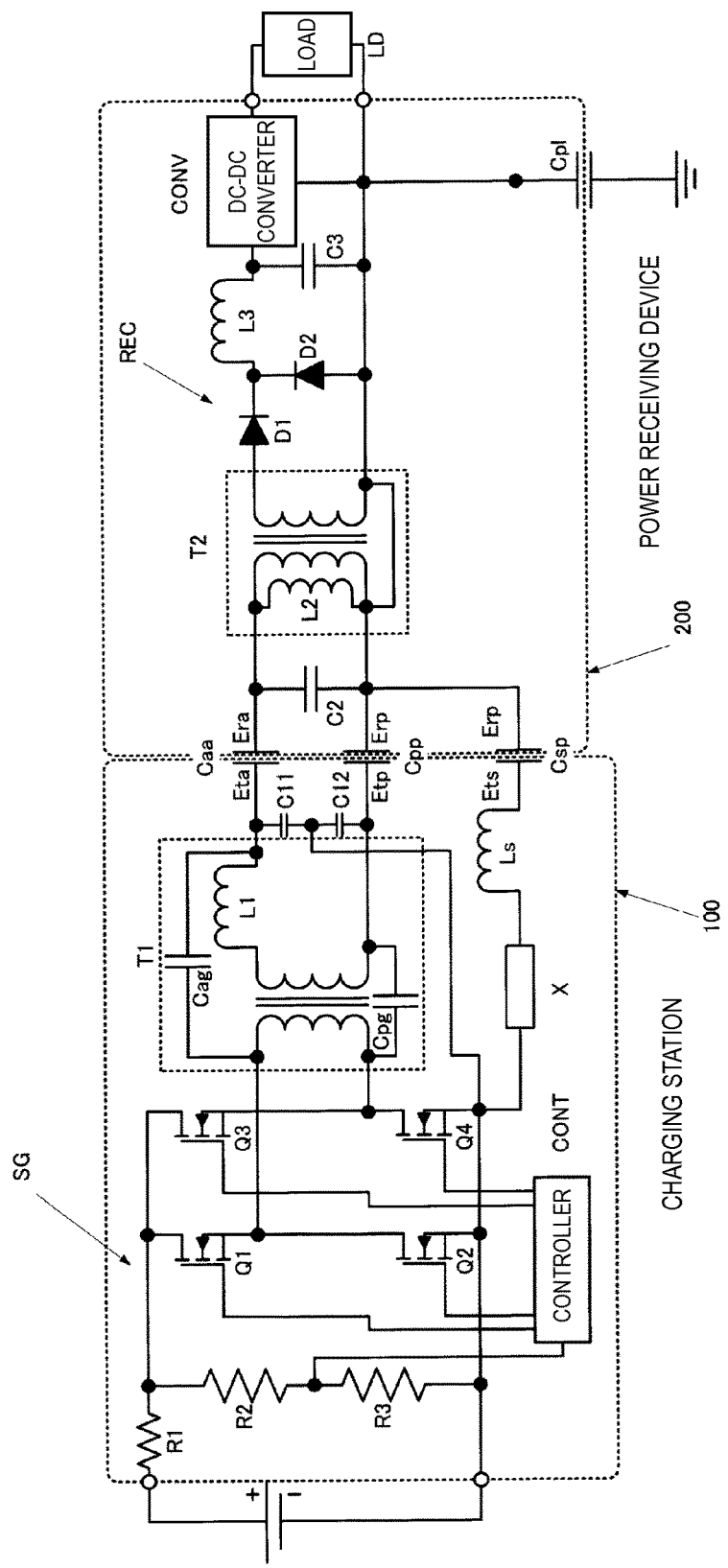
FIG. 20 is a diagram illustrating a specific circuit configuration of a power transmission system according to the ninth embodiment of the present invention.

FIG. 19 is a diagram illustrating the circuit configuration of the power transmission system according to the ninth embodiment. FIG. 20 is a diagram illustrating circuit configurations of a charging station 100 and a power receiving device 200. Note that elements that are the same as those in the first embodiment are given the same reference numerals.

The present embodiment differs from the power transmission system according to the first embodiment in the following ways. That is, the step-down transformer T2 of the power receiving device 200 is a non-isolating transformer in which one end of a primary-side winding and one end of a secondary-side winding are connected. Furthermore, the power receiving device 200 does not include the reference potential electrode Err. With respect to the reference potential of the power receiving device 200, the step-down transformer T2 being non-isolating results in the power receiving electrode (power receiving-side passive electrode) Erp filling the role of the reference potential electrode. Other configurations are the same as in the power transmission system according to the first embodiment. Although the rectifier circuit REC has a rectifier portion formed by the two diodes D1 and D2 in the present embodiment, a diode bridge formed by the four diodes D as in the first—eighth embodiments may be employed as the rectifier portion. Other configurations are the same as in the power transmission system according to the first embodiment.

The power receiving electrode (power receiving-side passive electrode) Erp is disposed opposing the reference potential stabilizing electrode Ets of the charging station 100 when the power receiving device 200 is placed on the charging station 100. In this opposing state, a capacity Csp is formed between the power receiving electrode (power receiving-side passive electrode) Erp and the reference potential stabilizing electrode Ets. The reference potential of the power receiving device 200 and the reference potential stabilizing electrode Ets are coupled via this capacity Csp.

Tenth Embodiment

Hereinafter, a power transmission system according to a tenth embodiment of the present invention will be described in detail with reference to the drawings.

Figure 21:
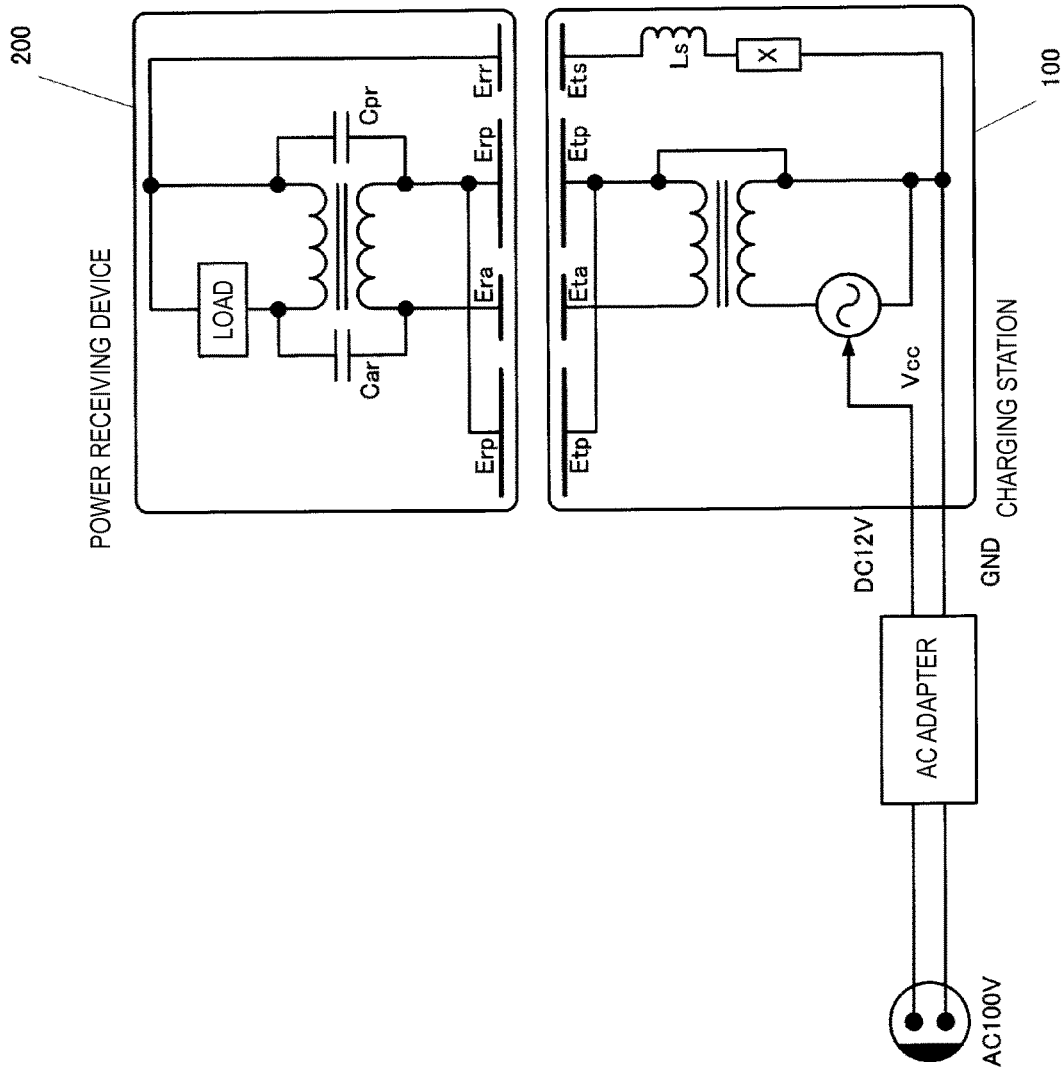
FIG. 21 is a diagram illustrating the configuration of a power transmission system according to a tenth embodiment of the present invention.
Figure 22:
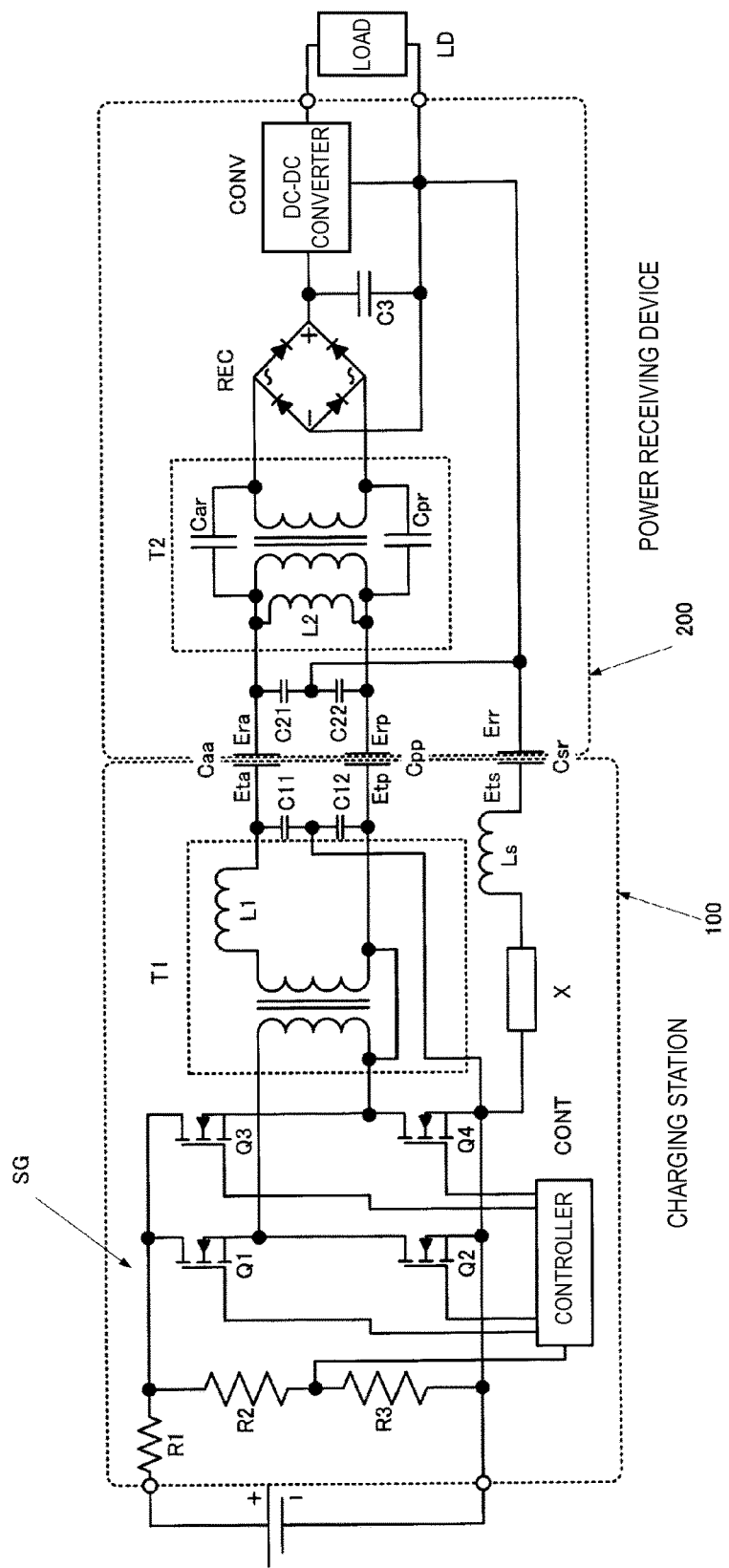
FIG. 22 is a diagram illustrating a specific circuit configuration of a power transmission system according to the tenth embodiment of the present invention.

FIG. 21 is a diagram illustrating the circuit configuration of the power transmission system according to the tenth embodiment. FIG. 22 is a diagram illustrating circuit configurations of a charging station 100 and a power receiving device 200. Note that elements that are the same as those in the first embodiment are given the same reference numerals.

The present embodiment differs from the power transmission system according to the first embodiment in the following ways. That is, the step-up transformer T1 of the charging station 100 is a non-isolating transformer in which one end of a primary-side winding and one end of a secondary-side winding are connected. Furthermore, the step-down transformer T2 of the power receiving device 200 is an isolating transformer in which a primary-side winding and a secondary-side winding are isolated. Other configurations are the same as in the power transmission system according to the first embodiment Other Embodiments Although the aforementioned embodiments use a configuration in which a serial resonance circuit and a parallel resonance circuit are capacitively coupled, the invention is not limited to this configuration. The configuration may be such that a serial resonance circuit and a serial resonance circuit are capacitively coupled. Furthermore, resonance need not be employed as long as fluctuations in the reference potential on the power receiving apparatus side can be suppressed.

In addition, although a pair each of active electrodes and passive electrodes are provided as the power transmitting electrodes and the power receiving electrodes in the aforementioned embodiments, two or more pairs each thereof may be provided.

A high-voltage portion (active electrodes, passive electrodes) may be surrounded by a shield conductor. Through this, the high-voltage portion (active electrodes, passive electrodes) are shielded from the surrounding environment (=earth), and the influence of fluctuations in the reference potential, noise, and so on caused by electric field leakage can be further suppressed.

REFERENCE SIGNS LIST 100 charging station
110 power transmitting-side reference potential stabilizing circuit
120 reactance control circuit
121 voltage detecting negative feedback circuit
130 harmonic attenuation circuit
200 power receiving device
300 AC adapter
Eta power transmitting electrode (power transmitting-side active electrode)
Etp power transmitting electrode (power transmitting-side passive electrode)
Etd potential detecting electrode
Ets power transmitting-side stabilizing electrode
Ers power receiving-side stabilizing electrode
Etr power transmitting-side reference potential electrode
Era power receiving electrode (power receiving-side active electrode)
Erp power receiving electrode (power receiving-side passive electrode)
Err power receiving-side reference potential electrode
REC rectifier circuit
C1 capacitor
C2 capacitor
C3 capacitor
Caa coupling capacity between power transmitting-side active electrode and power receiving-side active electrode
Cpp coupling capacity between power transmitting-side passive electrode and power receiving-side passive electrode
Csr coupling capacity between power transmitting-side stabilizing electrode and power receiving-side reference potential electrode
Crs coupling capacity between power transmitting-side reference potential electrode and power receiving-side stabilizing electrode
Cdr coupling capacity between potential detecting electrode and power receiving-side reference potential electrode
Cm coupling capacity
CONT controller
CONV DC-DC converter
D diode
L1 inductor
L2 inductor
L3 inductor
Ls inductor
LD load circuit
Q1, Q2, Q3, Q4 FET R1, R2, R3 resistor
SG signal source
T1 step-up transformer
T2 step-down transformer
X reactance element

The invention claimed is:

1. power transmission system comprising:
a power transmitting apparatus including:
at least one pair of first electrodes,
a signal source configured to provide an alternating current signal, and
a step-up transformer configured to step up a voltage of the alternating current signal and apply the stepped-up voltage to the at least one pair of first electrodes; and
a power receiving apparatus including:
at least one pair of second electrodes configured to capacitively couple with the at least one pair of first electrodes,
a step-down transformer configured to step down an AC voltage generated between the at least one pair of second electrodes,
a rectifying and smoothing circuit configured to rectify and smooth the stepped-down AC voltage, and
a load circuit coupled to the rectifying and smoothing circuit,
wherein one of the power transmitting apparatus and the power receiving apparatus further includes a potential stabilizing electrode coupled to a reference potential of the one apparatus via a charge controller, and
wherein the potential stabilizing electrode is configured to capacitively couple with an electrode connected to a reference potential of the other of the power transmitting apparatus and the power receiving apparatus.

2. The power transmission system according to claim 1, wherein at least one of the step-up transformer and the step-down transformer is an isolation transformer.

3. The power transmission system according to claim 2, wherein both the step-up transformer and the step-down transformer are isolation transformers, and wherein the electrode connected to the reference potential of the other of the power transmitting apparatus and the power receiving apparatus is separate from the at least one pair of second electrodes.

4. The power transmission system according to claim 1, wherein the charge controller is a reactance element.

5. The power transmission system according to claim 4, wherein the power transmitting apparatus includes the potential stabilizing electrode, the power receiving apparatus includes the electrode connected to the reference potential of the power receiving apparatus, and a frequency at which a combined reactance, of a capacitance formed between the electrode of the power receiving apparatus and the potential stabilizing electrode and a reactance of the reactance element, is a minimum is taken as a frequency of the alternating current signal provided by the signal source.

6. The power transmission system according to claim 5, wherein the reactance element is a variable reactance element.

7. The power transmission system according to claim 6, wherein the power transmitting apparatus further includes a reference potential detecting electrode that couples with the electrode connected to the reference potential of the power receiving apparatus, detects the reference potential on the power receiving apparatus, and controls the variable reactance element based on the detected reference potential of the power receiving apparatus.

8. The power transmission system according to claim 7, wherein the power transmitting apparatus further comprises a harmonic attenuation circuit configured to extract a harmonic component of the detected reference potential of the power receiving apparatus, adjust an amplitude component of the harmonic component, and provide the adjusted amplitude component as feedback to the potential stabilizing electrode.

9. The power transmission system according to claim 1, wherein the power receiving apparatus further includes an intermediate tap terminal coupling a node between the at least one pair of second electrodes and a primary winding of the step-down transformer, the intermediate tap terminal. being adjustable to set the reference potential of the power receiving apparatus to a same potential as the reference potential of the power transmitting apparatus.

10. The power transmission system according to claim 1, wherein the power receiving apparatus further includes an intermediate tap terminal coupling a node between the at least one pair of second electrodes and a secondary primary winding of the step-down transformer, the intermediate tap terminal being adjustable to set the reference potential of the power receiving apparatus to a same potential as the reference potential of the power transmitting apparatus.

11. The power transmission apparatus according to claim 6, further comprising an inductor coupled between the variable reactance element and the potential stabilizing electrode, wherein the variable reactance element is configured to be adjusted to obtain a voltage at each end of the inductor having a maximum value.

12. A power transmission apparatus comprising:
at least one pair of electrodes configured to capacitively couple with a pair of electrodes of a power receiving apparatus when the power receiving apparatus is positioned on the power transmission apparatus;
a signal source configured to provide an alternating current signal;
a step-up transformer configured to step up a voltage of the alternating current signal and apply the stepped-up voltage to the at least one pair of first electrodes;
a charge controller coupled to the signal source; and
at least one potential stabilizing electrode coupled to a reference potential of the power transmission apparatus via the charge controller,
wherein the potential stabilizing electrode is configured to capacitively couple with an electrode of the power receiving apparatus that is connected to a reference potential of the power receiving apparatus.

13. The power transmission apparatus according to claim 12, wherein the step-up transformer is an isolation transformer.

14. The power transmission. apparatus according to claim 13, wherein the charge controller is a reactance element.

15. The power transmission apparatus according to claim 14, wherein a frequency at which a combined reactance, of a capacitance formed between the electrode of the power receiving apparatus and the potential stabilizing electrode and a reactance of the reactance element, is a minimum is taken as a frequency of the alternating current signal provided by the signal source.

16. The power transmission apparatus according to claim 14, wherein the reactance element is a variable reactance element.

17. The power transmission apparatus according to claim 16, wherein the power transmitting apparatus further includes a reference potential detecting electrode that couples with the electrode connected to the reference potential of the power receiving apparatus, detects the reference potential on the power receiving apparatus, and controls the variable reactance element based on the detected reference potential of the power receiving apparatus.

18. The power transmission apparatus according to claim 17, further comprising a harmonic attenuation circuit configured to extract a harmonic component of the detected reference potential of the power receiving apparatus, adjust an amplitude component of the harmonic component, and provide the adjusted amplitude component as feedback to the potential stabilizing electrode.

19. The power transmission apparatus according to claim 16, further comprising an inductor coupled between the variable reactance element and the potential stabilizing electrode, wherein the variable reactance element is configured to be adjusted to obtain a voltage at each end of the inductor having a maximum value.

20. The power transmission apparatus according to claim 12, further comprising a plurality of potential stabilizing electrodes disposed in a uniform arrangement in a periphery of the at least one pair of electrodes.

\* \* \* \* \*